US011840488B2

(12) United States Patent
Michud et al.

(10) Patent No.: US 11,840,488 B2
(45) Date of Patent: Dec. 12, 2023

(54) METHOD FOR OBTAINING A COMPACTED MATERIAL AND COMPACTED MATERIAL OBTAINED THEREBY

(71) Applicant: ImerTech, Paris (FR)

(72) Inventors: Claire Michud, Villeurbanne (FR); Antoine Coulon, Limoges (FR); Aurélien Beck, Ruy-Montceau (FR); Jacques Poirier, St Pryvé-St Mesmin (FR); Emmanuel De Bilbao, Sandillon (FR)

(73) Assignee: IMERTECH, Paris (FR)

( * ) Notice: Subject to any disclaimer, the term of this patent is extended or adjusted under 35 U.S.C. 154(b) by 793 days.

(21) Appl. No.: 16/629,750

(22) PCT Filed: Jul. 12, 2018

(86) PCT No.: PCT/FR2018/051768
§ 371 (c)(1),
(2) Date: Jan. 9, 2020

(87) PCT Pub. No.: WO2019/012234
PCT Pub. Date: Jan. 17, 2019

(65) Prior Publication Data
US 2020/0181032 A1 Jun. 11, 2020

(30) Foreign Application Priority Data
Jul. 13, 2017 (FR) .......... 1756698

(51) Int. Cl.
*C04B 40/00* (2006.01)
*B28B 3/02* (2006.01)
(Continued)

(52) U.S. Cl.
CPC .......... *C04B 40/0067* (2013.01); *B28B 3/022* (2013.01); *B28B 3/10* (2013.01);
(Continued)

(58) Field of Classification Search
CPC ........ B28B 3/022; B28B 3/10; C04B 40/0067
See application file for complete search history.

(56) References Cited

U.S. PATENT DOCUMENTS 3,767,351 A * 10/1973 Blaser .............. B22F 3/03
425/432
8,303,708 B2 * 11/2012 Rigaud .............. C04B 28/04
106/713

FOREIGN PATENT DOCUMENTS

EP 0 557 368 9/1993
EP 557368 B1 * 9/1994 ............ C04B 14/34
(Continued)

OTHER PUBLICATIONS

International Search Report, PCT/FR2018/051768, dated Oct. 29, 2018.

*Primary Examiner* — Kelly M Gambetta
*Assistant Examiner* — Virak Nguon
(74) *Attorney, Agent, or Firm* — NIXON & VANDERHYE

(57) ABSTRACT

In a method for obtaining a compacted material, a) a set of particles of raw materials is mixed with 1-50% by weight of a hydraulic binder to form a dry composition, the percentage being relative to the total weight of the dry composition, the particle size distribution of the raw material particles being characterised by a first reference diameter ≤50 millimetres and a second reference diameter ≥0.08 micrometres, b) the dry composition is mixed with 1-35% by weight of water to form a mixed composition, the percentage relative to the total weight of the dry composition, c) the mixed composition is vibrated ≥0.3 millimetres at 20-80 Hertz, while a compressive stress is applied, the value of the applied compressive stress being at least 2 MegaPascal. Also dis-
(Continued)

Figure 1:
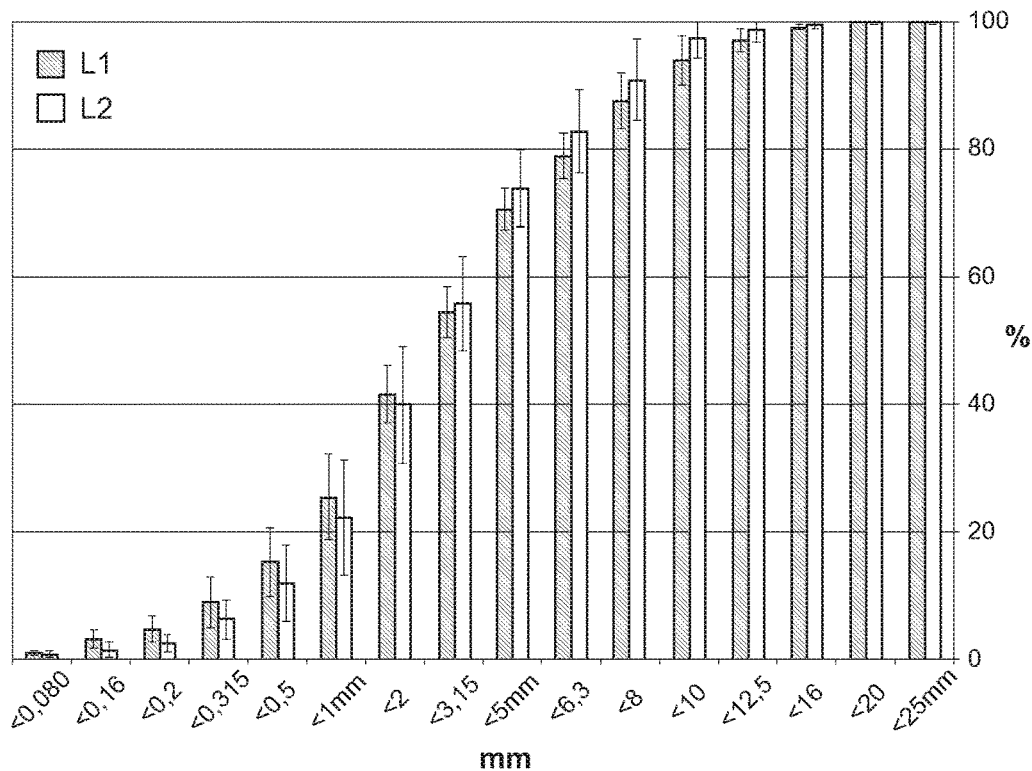

closed is a method for obtaining a multilayer compacted material and to the materials obtained according to the methods.

20 Claims, 1 Drawing Sheet

(51) Int. Cl.
   *B28B 3/10* (2006.01)
   *C04B 14/28* (2006.01)
   *C04B 14/30* (2006.01)
   *C04B 28/02* (2006.01)
   *C04B 111/00* (2006.01)

(52) U.S. Cl.
   CPC ............ *C04B 14/28* (2013.01); *C04B 14/303* (2013.01); *C04B 28/02* (2013.01); *C04B 40/0042* (2013.01); *C04B 40/0071* (2013.01); *C04B 2111/00612* (2013.01); *C04B 2201/50* (2013.01)

(56) References Cited

FOREIGN PATENT DOCUMENTS

FR     3 035 399     10/2016
GB     1 101 538     1/1968

\* cited by examiner

METHOD FOR OBTAINING A COMPACTED MATERIAL AND COMPACTED MATERIAL OBTAINED THEREBY

TECHNICAL FIELD TO WHICH THE INVENTION RELATES

The present invention relates generally to the field of compacted materials.

More particularly, it relates to a process for obtaining a compacted material.

It also relates to the compacted material obtained from this process.

TECHNOLOGICAL BACKGROUND

Many industrial processes use raw materials in the form of natural blocks, the size of which depends on the industrial process for which they are intended and/or the source or origin of the raw material. Generally, the blocks have a typical dimension of a few centimeters, for example between 5 centimeters and 20 centimeters.

These blocks are intended to be manipulated, in particular during their extraction, handling, transport, weighing, conveying, etc., before being used in the industrial process for which they are intended. All of this manipulation generates impacts and friction and leads to the formation of dust, or fine particles of raw material, usually called "fines", which are not desirable in industrial processes using said blocks. It is then known to recycle these fine particles of raw material by making compacted materials (also called agglomerates or briquettes, unrelated to the actual shape of these compacted materials) that can be used in industrial processes usually using natural blocks.

In particular, a process is known for the manufacture of a compacted material implemented on a roller compression machine, from a mixture comprising fine particles of raw materials and a Portland cement-type hydraulic binder or molasses. The compacted material obtained from this process, however, generates volatile organic compounds when used in industrial processes at high temperatures, especially above 500° C. Moreover, this compacted material tends to crumble and therefore generates so-called "secondary" fine particles. Finally, rotary machines are worn out prematurely when the fine particles of raw material used to form the compacted material are too hard, which is the case with bauxite particles, for example.

A process is also known for the manufacture of a "building block"-type material, carried out on building block presses, from a mixture comprising fine particles of raw material and a Portland cement-type hydraulic binder. According to this process, the mixture is placed under a low compressive stress, of the order of 0.01 megapascal. The building block obtained from this process also generates undesirable "secondary" fine particles. Furthermore, the resulting building block is not suitable for use in high-temperature industrial processes.

OBJECT OF THE INVENTION

In order to remedy the above-mentioned disadvantages of the prior art, the present invention proposes a process for obtaining a compacted material such that said compacted material obtained has improved mechanical compressive strength, generates fewer secondary fine particles, and can be exposed to temperatures between 500° C. and 1700° C.

More particularly, according to the invention, a process is proposed for obtaining a compacted material according to which, a) a dry composition is formed by mixing, on the one hand, a set of raw material particles whose particle size distribution is characterized by a first reference diameter d90 less than or equal to 50 millimeters and a second reference diameter d10 greater than or equal to 0.08 micrometer with, on the other hand, from 1% to 50% of a hydraulic binder, by mass based on the total mass of the dry composition, b) said dry composition formed in step a) is mixed with 1% to 35% water, by mass based on the total mass of the dry composition, to form a mixed composition, c) the mixed composition obtained in step b) is first vibrated at a frequency between 20 hertz and 80 hertz and at an amplitude greater than or equal to 0.3 millimeter, and then, in conjunction with the vibration, a compressive stress is applied to said mixed composition, the value of said applied compressive stress being greater than or equal to 2 megapascals.

According to the process of the invention, it is thus provided in step c) to couple the vibration of the composition to the application of a high compressive stress on this composition to form a compacted material whose mechanical compressive strength is improved and whose crumbling rate is reduced. Reducing the crumbling rate means reducing the generation of secondary fine particles or, equivalently, increasing the abrasion resistance of said compacted material.

According to the process of the invention, it is also possible, in step a), to adjust the size of the raw material particles of the set of particles as well as the nature of the hydraulic binder used, so that it is possible to adjust the mechanical performance of the compacted material obtained according to the industrial process for which it is intended. The process in particular allows, prior to step a), additional sieving and/or crushing operations in order to adjust the size of the particles used and/or to modify the particle size distribution of said particles.

Unexpectedly, the combination of the particle size characteristics of the raw material particles and the nature of the hydraulic binder, in addition to the high vibration and compression applied to the composition, makes it possible both to improve the mechanical compressive strength of the compacted material and to reduce the generation of secondary fine particles, both when manipulating the compacted material at room temperature and when using the compacted material in industrial processes at high temperature (500° C. and above) which involve a phase transformation and in particular a step of melting said compacted material.

The process according to the invention also leads to the production of a compacted material in the form of a single layer or of several layers of uniform raw materials. This compacted material has an early compressive strength, i.e. it is resistant to compression only a few hours after its formation, notably 24 hours after its formation.

Furthermore, the process according to the invention generates a compacted material which does not emit volatile organic compounds so that it is possible to use said compacted material in industrial processes at high temperatures, for example between 500° C. and 1700° C.

Non-limiting and advantageous features of the process in accordance with the invention, taken individually or in all technically possible combinations, are the following:

- a first layer of material is formed with the mixed composition obtained at the end of step b),
- in a step p1) prior to step c), at least one other mixed composition is formed by repeating steps a) and b),
- in a step p2), said other mixed composition obtained in step p1) is placed on top of said first layer formed at the end of step b), so as to form a stack of at least two layers of mixed compositions, and
- in step c), said stack formed in step p2) is vibrated, at said frequency between 20 hertz and 80 hertz and at said amplitude greater than or equal to 0.3 millimeter, and then, in conjunction with said vibration, said compressive stress is applied to said stack;
- in a step n1), a core of raw materials is provided, said core having a mechanical strength greater than or equal to 0.1 megapascal (MPa),
- in a step n2) carried out prior to step c), said core is completely enclosed in at least one of the mixed compositions obtained in step b) and/or in step p1), and,
- in step c), said assembly comprising said at least one mixed composition and said enclosed core is vibrated, at said frequency between 20 hertz and 80 hertz and at said amplitude greater than or equal to 0.3 millimeter, and then, in conjunction with said vibration, said compressive stress is applied to said assembly;
- in a step n1), a core of raw materials is provided, said core having a mechanical strength greater than or equal to 0.1 megapascal (MPa),
- in a step n2') carried out prior to step c), said core is completely enclosed in said mixed composition obtained in step b) and/or in at least one of said other mixed compositions obtained in step p1), and,
- in step c), said assembly comprising said at least one mixed composition and said enclosed core is vibrated, at said frequency between 20 hertz and 80 hertz and at said amplitude greater than or equal to 0.3 millimeter, and then, in conjunction with said vibration, said compressive stress is applied to said assembly;
- said core is a compacted material formed by compaction of another set of raw material particles;
- said core is obtained according to the process of the invention.

The invention also relates to a process for obtaining a multilayer compacted material according to which
a first layer is made according to the following steps:

- a) a dry composition is formed by mixing, on the one hand, a set of raw material particles whose particle size distribution is characterized by a first reference diameter d90 less than or equal to 50 millimeters and a second reference diameter d10 greater than or equal to 0.08 micrometer with, on the other hand, from 1% to 50% of a hydraulic binder, by mass based on the total mass of the dry composition,
- b) said dry composition formed in step a) is mixed with 1% to 35% water, by mass based on the total mass of the dry composition, to form a mixed composition,
- c) the mixed composition obtained in step b) is vibrated at a frequency between 20 hertz and 80 hertz and at an amplitude greater than or equal to 0.3 millimeter, and then, in conjunction with the vibration, a compressive stress is applied to said mixed composition,
and, for each subsequent layer, another mixed composition is made by repeating steps a) and b), said other mixed composition is placed on top of the previous layer, the assembly thus formed by the previous layer and the other mixed composition is vibrated, and a compressive stress is applied to said assembly,
the value of the applied compressive stress being greater than or equal to 2 megapascals, at least for the making of the last layer of said multilayer compacted material.

Thus, this other process makes it possible to produce a multilayer compacted material in the form of a stack of layers superimposed on each other, the layers of raw materials of which are agglomerated together.

Other non-limiting and advantageous features of the processes in accordance with the invention, taken individually or in all technically possible combinations, are the following:

- for each layer, it is provided that the vibration implemented in conjunction with the application of the compressive stress is disharmonized;
- for each layer, the vibration has an amplitude between 0.3 millimeter and 5 millimeters, according to the direction of compression;
- there is further provided a step subsequent to step c) for obtaining the compacted material, during which said compacted material is placed for at least 24 hours in a drying oven at a predetermined temperature, and at a relative humidity greater than or equal to a threshold value of relative humidity;
- for each layer, the raw material particles of the or each set of particles are mineral particles, selected from: red bauxite, white bauxite, alumina, limestone, lime, carbon, carbon graphite, carbon black, rock wool, glass wool, carbonates, metallurgical effluents, powders of manganese or its derivatives, metal ores or mixtures of ores as they may occur during extraction or during manufacturing processes, notably metal oxides or iron ores;
- for at least one layer or for at least one set of raw material particles, the first reference diameter d90 associated with the particle size distribution of the set of raw material particles is less than 20 millimeters and the second reference diameter d10 associated with said particle size distribution is greater than or equal to 0.1 micrometer;
- for each layer, the hydraulic binder is selected from: Portland cements, calcium aluminate cements, sulfoaluminate cements, cements mixed with fly ash, cements mixed with blast furnace slag, cements mixed with pozzolans, or a mixture of the latter;
- for at least one layer or for at least one step a), the hydraulic binder comprises a calcium aluminate cement having a C/A molar ratio between 0.1 and 3;
- for at least one layer or for at least one step a), the hydraulic binder is composed of a set of hydraulic binder particles whose particle size distribution is characterized by a first reference diameter d90 less than or equal to 100 micrometers.

Finally, the invention proposes a compacted material comprising particles of raw material agglomerated by a hydraulic binder, obtained according to one of the processes of the invention.

Advantageously, the material according to the invention has a mechanical compressive strength greater than or equal to 3 megapascals and a crumbling rate less than or equal to 15%.

In the case where the compacted material comprises at least two layers of raw materials agglomerated together, said layers of raw materials are inert with respect to each other up to a predetermined threshold temperature.

In particular, in the multilayer compacted material comprising a stack of at least two superimposed layers, the layers of raw materials are inert with respect to each other up to a predetermined threshold temperature.

In the multilayer compacted material comprising a core enclosed in at least one outer layer, the raw materials of the core are inert with respect to the raw materials of said at least one outer layer in which it is enclosed, up to a predetermined threshold temperature.

Advantageously, the multilayer compacted material can be used in industrial processes requiring the input of at least two types of raw materials. By virtue of its multiple layers, the multilayer compacted material can notably have a chemical composition close to that desired for the product at the end of the industrial process in which said multilayer compacted material is used. Thus, in addition to the advantages already mentioned for the single-layer compacted material, the multilayer compacted material makes it possible to improve the control of chemical reactions within industrial processes, thus limiting the production of downgraded or non-standard products, while avoiding certain classical phenomena when two raw materials are used, such as the sticking of raw materials together. Furthermore, the multilayer compacted makes it possible to optimize the energy consumption of industrial processes in which they are used, as well as to increase productivity. The multilayer compacted material also makes it possible in some cases to reduce wear and tear of installations in which it is used.

DETAILED DESCRIPTION OF AN EXAMPLE EMBODIMENT

The description that follows, together with the accompanying drawings, given by way of non-limiting examples, will make it clear what the invention consists of and how it can be realized.

Figure 2:
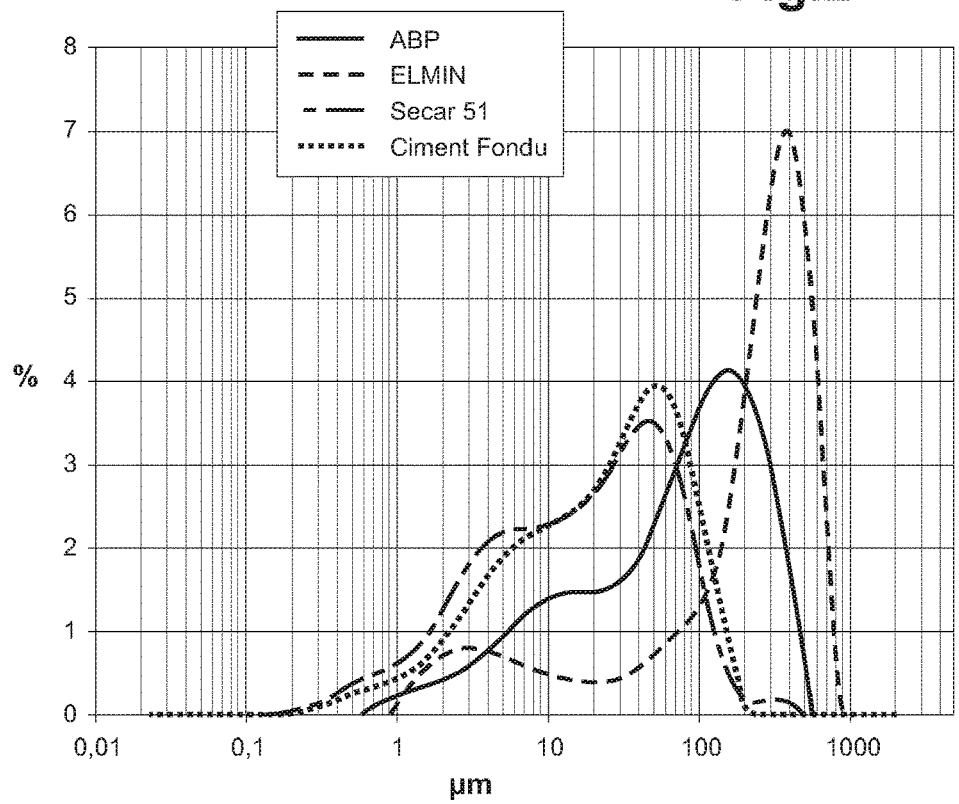

On the accompanying drawings:

FIG. 1 shows an example of the cumulative particle size distribution of two batches of fine particles of red bauxite L1 and L2, the y-axis representing the cumulative percentage of fine particles of the batch in question having a diameter less than or equal to the dimension indicated on the x-axis, by mass based on the total mass of the set of fine particles of that batch, and, FIG. 2 shows an example of the particle size distribution of a batch of fine particles of red bauxite called "ELMIN", a batch of fine particles of white bauxite called "ABP", a batch of fine particles of Ciment Fondu® cement and a batch of fine particles of Secar® 51 cement, the y-axis representing the percentage of fine particles of red bauxite having a diameter equal to the dimension indicated on the x-axis, by volume based on the total volume of the set of fine particles of this batch.

The present invention relates to a process for obtaining a compacted material of raw materials enabling the fine particles of raw materials to be recycled for use both in industrial processes which require an input of raw materials in the form of blocks, and in industrial processes which impose high temperatures on said compacted material, notably 500° C. and above.

More precisely, the process according to the invention comprises the following steps:

a) a dry composition is formed by mixing, on the one hand, a set of raw material particles whose particle size distribution is characterized by, i.e. defined by, a first reference diameter d90 less than or equal to 50 millimeters and a second reference diameter d10 greater than or equal to 0.08 micrometer with, on the other hand, from 1% to 50% of said hydraulic binder, by mass based on the total mass of the dry composition, b) said dry composition formed in step a) is mixed with 1% to 35% water, by mass based on the total mass of the dry composition, to form a mixed composition, c) the mixed composition obtained in step b) is first vibrated at a frequency between 20 hertz and 80 hertz and at an amplitude greater than or equal to 0.3 millimeter, and then, in conjunction with the vibration, a compressive stress is applied to said mixed composition, the value of said applied compressive stress being greater than or equal to 2 megapascals (MPa).

The remainder of the description details each step of the process in more detail.

Step a)

In step a), the set of raw material particles comprises raw material particles selected from inorganic or organic raw material particles. Preferably, inorganic raw material particles will be chosen. They can be inorganic of natural origin, i.e. raw materials known as "minerals", or inorganic of synthetic origin.

Generally, all raw material particles that are compatible with the hydraulic binder, i.e. that do not react with the hydraulic binder, can be used in step a).

The set of raw material particles comprises for example particles of raw material selected from the following list of raw materials: red bauxite, white bauxite, alumina, limestone, lime, carbon, notably carbon graphite and carbon black, rock wool, glass wool, carbonates, or metallurgical effluents, notably slag-type metallurgical effluents.

The set of raw material particles may also comprise particles of raw materials selected from: powders of manganese or its derivatives, metal ores or mixtures of ores as they may be found during extraction or during manufacturing processes, notably metal oxides or iron ores.

Preferably, the raw materials are selected from the following list: red bauxite, white bauxite, alumina, limestone, lime, and carbon black.

More preferably, the raw materials are selected from the following list: red bauxite, white bauxite, alumina and limestone.

The set of raw material particles comprises one or more different types of raw materials, e.g. of different physicochemical nature. Thus, the set of raw material particles can comprise either a single type of raw material or a mixture of several different raw materials.

Preferably, in step a) the set of raw material particles comprises a single type of raw material particle.

In the remainder of the description, the raw material particles will be referred to as "fine particles" since their diameter is distinctly smaller than both the main dimension of the natural raw material blocks and the compacted material obtained according to the process.

The "diameter" of a particle is defined here as the largest dimension of the particle, regardless of its shape.

Each particle of the set of raw material particles has a diameter of its own so that the particle set is characterized by, i.e. defined by, its particle size distribution, also called "granulometry", i.e. the statistical distribution of the sizes (or diameters) of the particles of the particle set. The particle size distribution, depending on requirements, can be given by volume, by mass, or by number of particles. In the remainder of the description, the particle size distribution will always be given by mass, except in FIG. 2 where it is given by volume. The particle size distribution given by volume is equivalent to the particle size distribution given by mass, the density factor of the raw material linking the two types of particle size distribution.

More precisely, it is possible to define reference diameters d90, d10 and d50 of the particle size distribution of any set of particles, said reference diameters being quantities representative of the statistical distribution of the sizes of the particles of this set.

Thus, the first reference diameter d90 representative of the particle size distribution of the particle set is defined as the diameter below which are located 90% of the fine particles used, by mass based on the total mass of the set of said fine particles.

In other words, for a set of fine particles whose particle size distribution is characterized by, i.e. defined by, a given first reference diameter d90, 90% of the fine particles of the set have a diameter smaller than this given first reference diameter d90, by mass based on the total mass of the particle set, and 10% of the fine particles of the set have a diameter greater than this given first reference diameter d90, by mass based on the total mass of the particle set.

In other words, the particles of the particle set with a diameter smaller than the first reference diameter d90 represent 90% of the total mass of the particle set, when the particle size distribution is by mass.

Here, the first reference diameter d90 representative of the particle size distribution of the set of fine particles of raw material mixed in step a) will be chosen less than or equal to 50 millimeters (mm), preferentially less than or equal to 20 millimeters (mm). Preferentially, the first reference diameter will be between 15 millimeters (mm) and 100 micrometers ($\mu m$), more preferably between 10 millimeters (mm) and 500 micrometers ($\mu m$), or even between 5 millimeters (mm) and 1 millimeter (mm). The first reference diameter d90 could also be chosen much smaller than those indicated above, for example less than or equal to 1 micrometer. Notably, the first reference diameter d90 may be chosen less than or equal to 20 mm, 15 mm, 10 mm, 5 mm; 1 mm, 900 $\mu m$, 800 $\mu m$, 700 $\mu m$, 600 $\mu m$, 500 $\mu m$, 400 $\mu m$, 300 $\mu m$, 200 $\mu m$, 100 $\mu m$, 50 $\mu m$, 20 $\mu m$, 10 $\mu m$; 5 $\mu m$, 1 $\mu m$, 0.5 $\mu m$, 0.4 $\mu m$, 0.3 $\mu m$.

The second reference diameter d10 representative of the particle size distribution of the particle set is defined as the diameter below which are located 10% of the fine particles used, by mass based on the total mass of the set of said fine particles.

In other words, for a set of fine particles whose particle size distribution is characterized by, i.e. defined by, a given second reference diameter d10, 10% of the fine particles of the set have a diameter smaller than this given second reference diameter d10, by mass based on the total mass of the fine particle set, and 90% of the fine particles of the set have a diameter greater than this given second reference diameter d10, by mass based on the total mass of the fine particle set.

In other words, the particles of the particle set with a diameter smaller than the second reference diameter d10 represent 10% of the total mass of the particle set, when the particle size distribution is by mass.

The second reference diameter d10 representative of the particle size distribution of the set of fine particles of raw material mixed in step a) will, in turn, be chosen greater than or equal to 0.08 micrometer ($\mu m$), preferentially greater than or equal to 0.1 micrometer ($\mu m$), said second reference diameter d10 being of course always smaller than the first reference diameter d90. Preferentially, the second reference diameter d10 will be between 1 micrometer ($\mu m$) and 5 millimeters (mm), preferably between 10 micrometers ($\mu m$) and 1 millimeter (mm), or even between 100 micrometers ($\mu m$) and 500 micrometers ($\mu m$). In particular, the second reference diameter d10 may be chosen greater than or equal to 0.1 $\mu m$, 0.2 $\mu m$, 0.3 $\mu m$, 0.4 $\mu m$, 0.5 $\mu m$, 0.6 $\mu m$, 0.7 $\mu m$, 0.8 $\mu m$, 0.9 $\mu m$, 1 $\mu m$, 2 $\mu m$, 3 $\mu m$, 4 $\mu m$, 5 $\mu m$, 6 $\mu m$, 7 $\mu m$, 8 $\mu m$, 9 $\mu m$, 10 $\mu m$, 20 $\mu m$, 50 $\mu m$, 100 $\mu m$, 200 $\mu m$, 500 $\mu m$, 1 mm, 2 mm, 3 mm, 4 mm, 5 mm.

The median diameter d50 representative of the particle size distribution of a set of particles is the diameter below which are located 50% of the fine particles used, by mass based on the total mass of the set of said fine particles. Thus, for a set of fine particles whose particle size distribution is characterized by, i.e. defined by, a given median diameter d50, 50% by mass of the fine particles of the set have a diameter smaller than this given median diameter d50, and 50% by mass of the fine particles of the set have a diameter greater than this given median diameter d50.

The reference diameters d90, d10 and median d50 characteristic of the size distribution, i.e. defining the size distribution, of any set of fine particles are obtained from a particle size curve representing the statistical size distribution of each of the fine particles of that set.

In practice, the diameters d90, d10 and d50 can be determined by different techniques, such as the sedimentation method (X-ray absorption detection) or the laser diffraction method (ISO 13320).

In the context of the present invention, the size of the fine particles is measured according to norm ISO 13320 by the laser diffraction method with, for example, a Mastersizer 2000 laser particle size analyzer, commercialized by Malvern company.

FIG. 1 shows an example of the cumulative size distribution of two batches (or sets) L1 and L2 of fine particles of red bauxite. More precisely, in FIG. 1, the y-axis represents the cumulative percentage of fine particles in the batch in question having a diameter less than or equal to the size indicated on the x-axis, by mass based on the total mass of the set of fine particles of that batch. This graph shows, for these two batches of fine particles of red bauxite, a first reference diameter d90 of about 8 millimeters, a second reference diameter d10 between about 0.5 millimeter and 0.315 millimeter, and a median diameter d50 between 2 millimeters and 3.15 millimeters.

The particle size distribution of the fine particles can be monomodal, meaning that among all the diameters adopted by the particles of the set of particles, one diameter is dominant over the other diameters, or that one of the diameters is adopted by a distinctly higher percentage of particles in comparison with the other adopted diameters.

Alternatively, the particle size distribution may be multimodal, meaning that among all the diameters adopted by the particles of the particle set, several diameters are dominant over the other diameters, or that in close diameter ranges, certain diameters are adopted by a higher percentage of particles.

FIG. 2 shows an example of the bimodal particle size distribution of a batch of fine particles of red bauxite known as "ELMIN". More precisely, in FIG. 2, the y-axis represents the percentage of fine particles of red bauxite having a diameter equal to the dimension indicated on the x-axis, by volume based on the total volume of the set of fine particles of that batch.

On this curve, two peaks can be seen in the particle size distribution of the particle diameters of the ELMIN particle set, namely a first peak of particles with a diameter of 400 micrometers (7% by mass of the particles), and a second peak of particles with a diameter of about 2.5 micrometers (0.8% by mass of the particles).

Generally, the difference between the first reference diameter d90 and the second reference diameter d10 reflects the spread of the particle size distribution. Thus, the smaller the difference between the first and second reference diameters d90 and d10, the "narrower" the particle size distribution, i.e., the narrower the range of particle diameters of the particle set, or the closer together the diameter values. Conversely, the greater the difference between the first and second reference diameters d90 and d10, the "wider" the particle size distribution, i.e., the particle diameters of the particle set are within a wide range of values, or the diameter values may be far apart.

In the context of the present invention, the particle size distribution may be chosen relatively narrow or wide as required. Notably, a set of raw material particles with a wide grain size distribution will have better grain stacking, so that less hydraulic binder will be required to make the compacted material. The compacted material made from this set of particles will develop better mechanical compressive strength. On the other hand, its crumbling rate will be higher than that of a compacted material made from a particle set with a narrower particle size distribution.

Notably, prior to step a), additional operations of sieving, and/or crushing, and/or grinding, and/or assembling different particle size slices, and/or adding fillers are possible in order to adjust the size of the particles used and to modify the particle size distribution of said particle set.

The process according to the invention aimed at promoting the recycling of fine particles of raw materials, it is however important to limit the additional costs and to use as much as possible the fine particles as they are generated during the various stages of manipulating the blocks of raw material.

Furthermore, advantageously, prior to step a), the fine particles of raw materials are here dried by being placed in a drying oven at 110° C. for 24 hours.

In step a) of the process according to the invention, the fine particles of raw materials, here previously dried, are mixed with the hydraulic binder, and optionally with other dry additives, to form the dry composition.

The preliminary step of drying the raw materials is optional but is preferred to facilitate the implementation of step b) of mixing the dry composition.

In the remainder of the description, the term "hydraulic binder" will refer to a powder, or a mixture of powders, adapted to be mixed with water to form a material with a pasty consistency capable of hardening to agglomerate particles together. In other words, in the remainder of the description, the term "hydraulic binder" is used to refer to materials that, when mixed with water, harden when cold, without the addition of another reactive substance, and in air as well as in water.

The term "dry composition" will refer to a mixture of dry materials, i.e. materials having a residual moisture content of 15% or less, the residual moisture content being evaluated by calculating the difference (also called mass loss) between the gross mass of a set of raw material particles and its mass after drying in an oven at 110° C. for 24 hours, and dividing this difference by said gross mass. In other words, the residual moisture is obtained according to the following formula: [(Gross mass)−(Mass after oven drying)]/(Gross mass).

Thus, here, the dry composition will refer to the mixture of the hydraulic binder with the fine particles of raw materials (said fine particles of raw materials not necessarily having been oven dried), and optionally other additives.

A water-mixed composition is a dry composition to which water has been added. After a certain time of contact with water, a hydraulic binder (or a dry composition comprising a hydraulic binder) hardens due to its hydration reaction with water, it is said to "set".

The hydraulic binder here is selected from: Portland cements, calcium aluminate cements, sulfoaluminate cements, cements mixed with fly ash, cements mixed with blast furnace slag, cements mixed with pozzolans, or a mixture of the latter.

Preferably, the hydraulic binder is a set of hydraulic binder particles, the particle size distribution of which is characterized by a first reference diameter d90 less than or equal to 100 micrometers.

The dry composition comprising the hydraulic binder and the set of fine raw material particles may have a monomodal or multimodal particle size distribution, i.e. the set of hydraulic binder and raw material particles may have a single dominant diameter or several dominant diameters.

Preferably, the hydraulic binder comprises a calcium aluminate cement, i.e. a calcium aluminate powder.

Indeed, the use of calcium aluminate cement in the process according to the invention makes it possible to obtain a compacted material generating fewer secondary fine particles, notably when used in industrial processes at high temperature, i.e. above 500° C.

The use of calcium aluminate cement in the process according to the invention also makes it possible to obtain a compacted material whose disintegration temperature, also called melting temperature, is predetermined.

Calcium aluminate cement can be characterized by the molar ratio between the lime CaO (C according to the cement manufacturers' notation) and the alumina $Al_2O_3$ (A according to the cement manufacturers' notation) that it contains, more commonly known as the C/A ratio (according to the cement manufacturers' notation).

Here, the calcium aluminate cement used has a C/A molar ratio between 0.1 and 3.

The hydraulic binder can for example be Ciment Fondu®, with a C/A ratio of 0.95, or SECAR® 51 cement with a C/A ratio of 0.71.

Here, the dry composition comprises from 1% to 50% hydraulic binder, even more preferentially from 2.5% to 15% hydraulic binder, by mass based on the total mass of the dry composition.

In practice, the amount of hydraulic binder added in the dry composition depends on the nature of the hydraulic binder, the nature of the fine particles of raw materials and their granular distribution, and the properties sought for the compacted material, notably in terms of mechanical compressive strength.

Generally, an increase in the hydraulic binder content in the dry composition leads to an improvement in mechanical performance, but also to an increase in cost. There is thus a compromise to be found.

Furthermore, the Applicant noticed that an increase in the hydraulic binder content in the dry composition leads to an increase in mechanical strength up to a certain point, but an excess of hydraulic binder is incompatible with the compression operation and is not economically favorable.

It is also possible, in step a), to add additives to the dry composition. Notably, according to the needs, it is possible to add rheology modifiers such as surfactants or superplasticizers (also called "shear-thinning agents"), as well as setting retarders or accelerators in order to better control the workability of the water-mixed composition, i.e. here the time during which the water-mixed composition has a viscosity allowing its introduction into the compression mold.

The additives also make it possible to better homogenize the mixture between the raw materials and the hydraulic binder, notably in cases where said raw materials and said binder do not have any particular affinity with each other.

It is notably possible to add Defoam® (Peramin) or Vinapor (BASF) as surfactant, Compac500® (Peramin) as superplasticizer, and lithium carbonate as setting accelerator.

For example, when rock wool is used as raw material, and Ciment Fondu® as hydraulic binder, it is possible to use lithium carbonate dissolved in concentrated soda ash as additive. In practice, it will be possible in particular to generate a composition comprising, by mass based on the total mass of the dry composition:

86.4% rock wool,
12.9% Ciment Fondu®,
0.7% lithium carbonate ($Li_2CO_3$).

The pH of the mixing water added to this dry composition is adjusted to 13 by adding a few drops of concentrated soda. In practice, in this particular case, for 38 milliliters (mL) of mixing water, 3.8 milliliters (mL) of soda solution concentrated to 1 mol/L is added to 34.2 milliliters (mL) of water.

Since the process according to the invention is intended for the recycling of fine particles of raw materials, the use of additives will be limited as far as possible for economic reasons. However, their use is not prohibited, as long as there is no negative effect either on the compression stage or on the final properties of the material compacted at high temperature (500° C. and above).

In practice, in step a), the fine particles of raw materials are weighed, as well as the hydraulic binder, any additives are added and the assembly is mixed manually or not. To facilitate mixing, it is preferable to use a mixer, for example a Perrier type mixer. Such a mixer can notably be set to rotate at a speed of 140 revolutions per minute, for 1 minute in the context of the present invention.

Step b)

The dry composition obtained at the end of step a) is mixed with 1% to 35% water, by mass based on the total mass of the dry composition, during step b) of the process according to the invention.

Preferably, the dry composition is mixed with 3% to 15% water, more preferably 3% to 9% water, by mass based on the total mass of the dry composition.

Generally, water is added in sufficient quantity to completely hydrate the hydraulic binder and to wet the surface of the fine particles of raw materials so as to obtain a homogeneous water-mixed composition. Excess water in the composition could make the water-mixed composition too sticky and cause problems when demolding it at the end of step c) and/or when cleaning the mold. Moreover, excess water could lead to a dewatering phenomenon during the compression phase of the composition which would generate brittleness in the final compacted material, said brittleness being created by the evacuation of the water along preferential paths. An insufficient quantity of mixing water could, in turn, generate a powdering phenomenon on the surface of the compacted material finally obtained, i.e. generate secondary fine particles on the surface of the compacted material.

In practice, in step b), the mixing water is added to the dry composition and mixed. It is notably possible to mix the composition in a Perrier type mixer, for example for 1 minute at a speed of 140 revolutions per minute.

To facilitate the humidification of the composition and the homogenization of the mixture, water is added, simultaneously or consecutively, in several different areas of the composition.

Step c)

The water-mixed composition thus obtained at the end of step b) is then vibrated.

For this purpose, the water-mixed composition is introduced into a rigid, for example steel, mold with a shape corresponding to the desired final shape of the compacted material. For example, the mold may have a cylindrical or parallelepipedal shape with a characteristic dimension of the order of about 10 centimeters, notably equal to 20 centimeters.

Once filled, the mold is vibrated, for example by being placed on a vibrating table, or by any other means of vibration. The term "filled" here means that the internal volume of the mold is at least partially occupied by the mixed composition.

Thanks to the vibration, the amount of air trapped within the water-mixed composition introduced into the mold is reduced.

In addition, the vibration helps to homogenize the fine particles of raw materials in the mold, in the event that segregation has occurred during the mixing step and/or the mold filling step. In other words, the vibration helps to homogenize the distribution of particles in the mold.

The vibration has a frequency between 20 hertz (Hz) and 80 hertz (Hz), preferably between 25 Hz and 75 Hz. This frequency range is well adapted to the viscosity of the composition introduced into the mold. For example, the vibration has a frequency of 20 Hz, 25 Hz, 30 Hz, 35 Hz, 40 Hz, 45 Hz, 50 Hz, 55 Hz, 60 Hz, 65 Hz, 70 Hz, 75 Hz or 80 Hz.

Advantageously, the vibration has an amplitude between 0.3 millimeter (mm) and 5 millimeters (mm). Notably, the vibration amplitude can be 0.3 mm, 0.4 mm, 0.5 mm, 0.6 mm, 0.7 mm, 0.8 mm, 0.9 mm, 1 mm, 1.5 mm, 2 mm, 2.5 mm, 3 mm, 3.5 mm, 4 mm, 4.5 mm or 5 mm. The vibration amplitude here corresponds to the maximum movement of the mold in a given direction. This amplitude range is also well adapted to the viscosity of the composition introduced into the mold. In other words, the amplitude represents the difference between the extreme positions of mold movement.

The composition introduced into the mold is vibrated for a period of between 2.5 seconds and 15 seconds.

Then, in conjunction with the application of vibration, compressive stress is applied to the composition.

Thus, the vibration of the composition is not only implemented prior to the application of the compressive stress, but also during the application of the compressive stress.

Advantageously, during compression of the composition, the vibration is directed in the direction of compression. In other words, the mold undergoes an oscillating movement according to the direction of compression.

Thus, for example, if the compression is generally vertical, the mold is moved up and down a few millimeters, namely by a distance equal to the vibration amplitude, at a predetermined frequency, namely equal to the vibration frequency.

Advantageously, during the application of the compressive stress, the applied vibration is disharmonized. In other words, the vibration has a nonharmonic profile. The term "nonharmonic" here means that the frequency and the amplitude of the vibration are not constant over time, i.e. a nonharmonic vibration is aperiodic (there is no periodicity of the vibration). Conversely, a "harmonic" vibration consists of one or more frequencies and amplitudes that remain constant over time, i.e. a harmonic vibration is periodic. In other words, the frequency and the amplitude of the applied disharmonized vibration are not regular over time, i.e. they adopt values that do not repeat regularly during the implementation of step c).

In practice, for example, the vibration can be deliberately disturbed by at least one shock, so as to make the vibration irregular (or aperiodic). Thus, not only is the mold moved regularly, i.e. periodically, according to the direction of compression, but it also receives at least one short, high-intensity disturbance to disharmonize the vibration. Thus, the disharmonized vibration has a profile corresponding to the sum of a sinusoidal profile and a disturbance.

For example, the vibration can be created by the rotation of at least one unbalance exciter connected to the vibrating table, and this vibration is disharmonized by at least one impactor hitting the vibrating table. It is also possible to use mobile wedges that are inserted between the unbalance exciters and the vibrating table plate so that the rotating unbalance exciters shock the wedges to create an acceleration that disharmonizes the vibration.

In practice, the specificities that apply preferentially to the vibration in conjunction with the application of compression, notably the direction of vibration and the disharmonization of the vibration, may also apply to the vibration implemented prior to the application of compression.

As mentioned, the process according to the invention subjects the composition to a high compressive stress, in combination with vibration.

Compressive stress is defined as a compressive force divided by the surface area to which said force applies, said surface being perpendicular to the compressive force, i.e. to the direction of the compressive force.

Here, the compressive stress applied to the composition is greater than or equal to 2 megapascals (MPa). In particular, the compressive stress can be between 2 megapascals (MPa) and 5 megapascals (MPa). It can also be chosen greater than or equal to 10 megapascals (MPa). For example, it is chosen equal to 2 MPa, 3 MPa, 4 MPa, 5 MPa, 6 MPa, 7 MPa, 8 MPa, 9 MPa, 10 MPa, 11 MPa, 12 MPa, 13 MPa, 14 MPa, 15 MPa, 20 MPa, 25 MPa, 30 MPa, 35 MPa, 40 MPa, 45 MPa, 50 MPa, 55 MPa, 60 MPa, 65 MPa, 70 MPa. This high compressive stress keeps the fine particles of raw material tightly together at the beginning of the setting of the hydraulic binder, thus ensuring a high cohesion of the particles with each other.

In practice, the greater the compressive stress applied to the material, the more the raw material particles are compacted together and the more the hydraulic binder is forced to insert itself between said particles to ensure the cohesion of the compacted material, i.e. its high mechanical compressive strength and low crumbling.

In practice, the compressive force is applied homogeneously to one side of the mixed composition introduced into the mold. For example, the compressive force is applied by means of a plunger of a size equal to the surface of one side of the mold.

Generally, step c) has a sufficiently short duration so that the composition does not have time to set in the mold. In other words, the water-mixed composition, due to the vibration and to the application of compressive stress, stands by itself without the hydraulic binder having yet really begun to react with the water, so that the compacted material obtained at the end of step c) can be demolded without deforming, without however having begun to harden. At the end of step c), the composition is firm enough to allow its demolding and delicate handling.

The compacted material is removed from the mold after step c). After demolding, the compacted material begins to set, i.e. the hydraulic binder is hydrated by the water and actually hardens. It develops its mechanical strength during this hardening process.

Advantageously, the demolding of the compacted material is preferably followed by a step in which the compacted material is placed in a drying oven, at a predetermined temperature, and under a humidity-controlled atmosphere. It is during this oven drying step that the hydraulic binder "sets" and thus the compacted material hardens.

Generally, the oven drying step amounts to ageing the compacted material, i.e. to hardening the material so that it begins to gain in mechanical strength, according to a phenomenon commonly known as "structuring". When using an aluminous cement, setting occurs 2 to 3 hours after the compression step, preferably during the oven drying step. This oven drying step influences the microscopic structure of the compacted material.

In practice, the oven drying conditions depend on the hydraulic binder used. Notably, the oven drying is carried out for a predetermined time, at a predetermined temperature, and at a relative humidity greater than or equal to a threshold value of relative humidity.

Here the choice is made to place the compacted material in the drying oven for 24 hours.

The threshold value of relative humidity is selected according to the hydraulic binder used.

For example, when the hydraulic binder used is a calcium aluminate cement, the compacted material is placed in a drying oven for at least 24 hours at a relative humidity of 80% or more.

The relative humidity of the air contained in the drying oven, also called the degree of humidity, is defined as the ratio of the partial pressure of the water vapor contained in the air to the saturation vapor pressure (or vapor tension) at the same temperature. In other words, relative humidity indicates the ratio between the water vapor content of the air in the drying oven and the maximum capacity of this air to contain water under predetermined temperature conditions.

The mechanical characteristics of the surface of the compacted material are crucial to limit the formation of secondary fine particles. In order to keep the formation of secondary fine particles to a minimum, the hydraulic binder must be as perfectly hydrated as possible. Sometimes the mixing water supplied in step b), prior to the vibration and to the application of compressive stress of step c), is insufficient to fully hydrate the dry composition, and notably the hydraulic binder. For this purpose, the relative humidity during oven drying must be preferentially above a first predetermined threshold value of 90% or even above a second predetermined threshold value of 95%.

In addition, the oven drying temperature is also essential for the final microscopic structure of the compacted material, and depends on the hydraulic binder used.

In practice, when the hydraulic binder used is a calcium aluminate cement, oven drying is carried out at a temperature between 10° C. and 28° C. Preferentially, oven drying is carried out at a temperature between 15° C. and 25° C., or even between 18° C. and 20° C.

When using other hydraulic binders such as Portland cement or calcium sulfate aluminates, higher oven drying temperatures are favorable to the development of mechanical strength.

When the hydraulic binder used is preferentially a calcium aluminate cement comprising calcium monoaluminate CA as main crystalline phase, with a C/A molar ratio of 1, the hydrates formed by the hydration reaction depend on the hydration temperature. However, the higher the hydration temperature, the less volume the hydrates formed occupy, the fewer water molecules are consumed by the CA phase to form said hydrates, and the less the hydrates formed contribute to the development of the mechanical strength of the compacted material. For this reason, the compacted material should be oven dried at a temperature high enough to promote the hydration reaction and thus the hardening of the compacted material, but low enough for the hydrates formed to give the desired properties to the compacted material and to minimize the phenomenon of conversion of these hydrates (i.e. the chemical transformation of hydrates by a dehydration phenomenon) obtained from calcium aluminate type hydraulic binder.

Thus, allowing the compacted material to complete its hardening in a drying oven improves the mechanical properties of the compacted material.

Of course, as an alternative, it is also possible to leave the material to finish curing in the open air, without oven drying.

The compacted material thus obtained forms a uniform layer of raw materials agglomerated by a hydraulic binder.

The compacted material thus obtained is characterized by a mechanical compressive strength at 20° C. greater than or equal to 3 megapascals.

In addition, it has a crumbling rate of less than 15%, preferably less than 10%. For example, the crumbling rate may be less than or equal to 15%, 14%, 13%, 12%, 11%, 10%, 9%, 8%, 7%, 6%, 5% or less.

This low crumbling rate ensures that the material generates few secondary fine particles. This means that its abrasion resistance is high.

The crumbling rate T, or rate of secondary fine particles generated, is the ratio between, on the one hand, the difference between the initial mass of the compacted material and the mass of said compacted material after crumbling, and, on the other hand, the initial mass of said compacted material. The crumbling rate is also expressed according to the following formula:

$$T=[\text{Initial mass}-\text{Final mass}]/\text{Initial mass}.$$

The "example" section below explains how the crumbling rate T is measured in practice.

Advantageously, according to the same principle as described above for obtaining a single-layer compacted material, it is possible to form a multilayer compacted material, i.e. comprising at least two distinct layers of raw materials.

Such a multilayer compacted material may notably comprise a stack of layers superimposed on each other, or layers enclosed in other layers thus forming a core integrally enclosed in at least one outer layer.

More precisely, the multilayer compacted material comprising a stack of at least two layers superimposed on each other is obtainable by the previously described process, completed as follows:
- a first layer of material is formed with the mixed composition obtained at the end of step b),
- in a step p1) prior to step c), at least one other mixed composition is formed by repeating steps a) and b),
- in a step p2), said other mixed composition obtained in step p1) is placed on top of said first layer formed at the end of step b), so as to form a stack of at least two layers of mixed compositions, and
- in step c), said stack formed in step p2) is vibrated, at said frequency between 20 hertz and 80 hertz and at said amplitude greater than or equal to 0.3 millimeter, and then, in conjunction with said vibration, said compressive stress is applied to said stack.

Step p1) is in all respects similar to steps a) and b) described above.

In other words, in step p1), another dry composition is formed by mixing another set of raw material particles whose particle size distribution is defined by a first reference diameter d90 less than or equal to 50 millimeters and a second reference diameter d10 greater than or equal to 0.08 micrometer with, on the other hand, from 1% to 50% of another hydraulic binder, by mass based on the total mass of the dry composition, and then said other dry composition formed is mixed with 1% to 35% water, by mass based on the total mass of said other dry composition, so as to form said other mixed composition.

Preferably the two mixed compositions obtained at the end of step b) and at the end of step p1) are different but it is conceivable that they are identical. Their difference may in particular be due to the nature of the raw material particles, and/or their particle size distribution, and/or the nature of the hydraulic binder used, and/or the amount of binder used and/or the amount of water used to mix the dry composition.

Step p1) can be repeated as many times as necessary to form as many mixed compositions, identical or different, as desired superimposed layers in the multilayer compacted material.

The first mixed composition obtained at the end of the first step b) is placed in the mold to form a first layer of material. The second mixed composition obtained at the end of step p1) is placed on top of this first layer so as to form a stack of two layers. This makes it possible to superimpose any number of mixed compositions in the mold so as to form a corresponding number of layers in the multilayer compacted material.

It is only after all the mixed compositions have been stacked one on top of the other in the mold that the latter is vibrated, under the conditions explained above for the process of obtaining the single-layer material (i.e. at a vibration having at least one frequency between 20 Hz and 80 Hz and an amplitude greater than or equal to 0.3 mm), and is then subjected to the compressive force greater than or equal to 2 megapascals in conjunction with the vibration.

In other words, step c) described above is carried out on the stack of layers formed by the superimposition of the mixed compositions. Step c) is therefore de facto applied to the first mixed composition included in said stack.

In particular, here, neither the first layer formed by the first mixed composition nor any of the intermediate layers formed by the addition of the other mixed compositions on top of each other are vibrated or subjected to any compressive force before the last mixed composition is placed on top of all the others. It is only after the last mixed composition has been placed on top of the others that the stack formed is vibrated and then, together with the vibration, subjected to the compressive force, under the conditions set out above for the process of obtaining the single-layer material.

This makes it possible to form, in a simple manner, a multilayer compacted material comprising at least two stacked layers.

Alternatively, before the last mixed composition is placed on top of the others to form the final stack, it is possible to vibrate at least the first layer or an intermediate stack formed of said first layer and any number of intermediate layers deposited on top of the first layer. It is also possible, before the last mixed composition is placed on top of the others to form the final stack, to subject to a compressive force at least the first layer or an intermediate stack formed of said first layer and any number of intermediate layers deposited on top of the first layer.

Vibration of the intermediate stack allows the particles to be optimally arranged in relation to each other. The application of compressive stress, even if low, to the intermediate stack makes it possible to obtain, after final demolding, regular layers. The aesthetic appearance of the final multilayer compacted material is therefore improved by intermediate compaction.

The multilayer compacted material comprising a core enclosed in at least one outer layer is obtainable by one of the previously described processes, completed as follows:
- in a step n1), a core of raw materials is provided, said core having a mechanical strength greater than or equal to 0.1 megapascal (MPa),
- in a step n2) or n2') prior to step c) of the previously described processes, said core is completely enclosed in at least one of the mixed compositions obtained in step b) and/or in step p1), and,
- in step c), said assembly comprising said at least one mixed composition and said enclosed core is vibrated, at said frequency between 20 hertz and 80 hertz and at said amplitude greater than or equal to 0.3 millimeter, and then, in conjunction with said vibration, said compressive stress is applied to said assembly.

In step n1), the core, intended to form an inner layer of the final multilayer compacted material, has a mechanical strength such that it is possible to handle this core to move it.

The mechanical strength in question here is the mechanical compressive strength, expressed in megapascals (MPa), evaluated according to the protocol described in norm EN 196.

In step n1, the core may be a natural solid material, such as a bauxite or limestone block.

It can also be a synthetic solid material, obtained by any compaction process, for example by compacting or granulating fines of natural or synthetic origin.

Notably, the core can be obtained by an already known compaction process.

Alternatively, the core may be a compacted material obtained by one of the processes of the invention described above. In other words, the core may be a "single-layer" compacted material obtained according to steps a), b) and c) described above, or a multilayer material comprising a stack of at least two layers obtained according to steps a), b), p1), p2) and c) described above.

When the core is a compacted material obtained by any kind of compaction process, the core preferably comprises a set of raw material particles which have characteristics similar to those of the set of particles used in step a) to obtain the composition intended to enclose said core. In particular, the particle size distribution and the nature of the raw materials of the other set of particles used to form the core will be as described above with reference to step a). However, the nature of the raw material particles, respectively the particle size distribution, of the other set of particles used to form the core is not necessarily identical to the nature of the raw material particles, respectively the particle size distribution, of the set of particles used to form the composition for enclosing the core.

Preferentially, in the final multilayer compacted material, the core as well as the outer layer(s) compacted around it are different. This difference may for example be due to the nature of the raw materials they comprise, and/or to the particle size distribution of their respective particle sets.

When the core is obtained according to one of the processes of the invention described above, it is possible that the amount, particle size distribution and nature of the hydraulic binder used to form the core may be similar to that of the binder used in the composition intended to enclose said core, i.e. the hydraulic binder of the core has the characteristics described above. Conversely, the nature, particle size distribution and/or amount of the hydraulic binder used to form the core may not be identical to that of the hydraulic binder used to form the mixed composition(s) surrounding the core.

Regardless of the method of providing the core in step n1), step n2) or n2'), the core is completely enclosed in at least one mixed composition obtained in step b) and/or in step p1). In other words, said mixed composition is placed both under, around and over the core so as to completely enclose said core in said mixed composition.

According to a first possibility, the core can thus be completely enclosed in one and the same mixed composition, for example that obtained in step b) (step n2)).

For this purpose, for example, said mixed composition obtained in step b) is placed at the bottom of a mold with dimensions (height and width) greater than those of the core, the core is placed thereon, which will then form the "core" of the multilayer compacted material, then the lateral space between the core and the mold is filled and said core is completely covered with said mixed composition.

The core may also be enclosed in the mixed composition obtained at the end of step p1) of the above process. In this case, the final multilayer compacted material obtained has a first layer and then a second layer in which said core is integrally enclosed (step n2')).

According to a second possibility, the core may be enclosed in two separate and different mixed compositions, so that it is partially surrounded by a first mixed composition and partially surrounded by a second mixed composition. This amounts to trapping the core at the interface between two superimposed layers of a stack of layers (variant of step n2').

For this purpose, for example, said mixed composition obtained in step b) is placed at the bottom of a mold with dimensions (height and width) greater than those of the core, the core is placed there, which will then form the "core" of the multilayer compacted material, the lateral space between the core and the mold is filled with this same mixed composition, up to half the height of the core, then filling the lateral space between the core and the mold with a second mixed composition obtained for example at the end of step p1), and completely covering said core with said second mixed composition.

Step c) is similar to that described above except that in the case of multilayer material with a core enclosed in at least one outer layer, vibration, and then compressive stress and vibration together, are applied to the assembly comprising the mixed composition(s) and the enclosed core.

The application of compressive stress to the assembly comprising the mixed composition(s) and the enclosed core results, in fact, in the application of this compressive stress to the core and the application of this compressive stress to the mixed composition(s). Thus, step c) is implemented, in fact, at least on the first mixed composition.

A multilayer compacted material comprising a core completely enclosed in at least one outer layer is thus obtained.

Alternatively, it is easily understood that the core used in step n1) can itself be a multilayer compacted material comprising another core enclosed in a layer, i.e. a multilayer compacted material obtained according to the process just described.

The remainder of what has been described in connection with the process for obtaining the single-layer compacted material is also applicable to the multilayer compacted material obtained by one of the processes of the invention (multilayer compacted material comprising a stack of layers superimposed on one another or multilayer compacted material comprising a layer encapsulated in at least one outer layer).

The multilayer compacted material comprising a stack of layers superimposed on each other can also be obtained according to a process for obtaining a multilayer compacted material according to which a first layer is produced according to the steps:

a) a dry composition is formed by mixing, on the one hand, a set of raw material particles whose particle size distribution is characterized by a first reference diameter d90 less than or equal to 50 millimeters and a second reference diameter d10 greater than or equal to 0.08 micrometer with, on the other hand, from 1% to 50% of a hydraulic binder, by mass based on the total mass of the dry composition, b) said dry composition formed in step a) is mixed with 1% to 35% water, by mass based on the total mass of the dry composition, to form a mixed composition, c') the mixed composition obtained in step b) is vibrated at a frequency between 20 hertz and 80 hertz and at an amplitude greater than or equal to 0.3 millimeter, and then, in conjunction with the vibration, a compressive stress is applied to said mixed composition.

Steps a) and b) of this process for obtaining a multilayer compacted material comprising a stack of layers are in all respects similar to steps a) and b) described above for the process for obtaining the single-layer compacted material.

Step c') is in all respects similar to what was previously described for step c) of the process for obtaining the single-layer compacted material, with the difference that it is not imperative that the value of the compressive stress applied in step c') be greater than or equal to 2 MPa. For example, it can be of the order of 0.1 MPa.

This first layer forms the bottom layer of the stack of layers.

Then, for the formation of the next layer, another mixed composition is made by repeating steps a) and b) described above and said other mixed composition is placed on top of the previous layer.

In practice, at the end of step c') of forming the first layer, and it is provided to add directly into the mold the other water-mixed composition obtained according to said repeated steps a) and b) (and similar).

Thus, said other mixed composition is placed on top of the first layer already formed, in the same mold.

Preferably, the other water-mixed composition is different from the first water-mixed composition used to form the first layer of material, notably in that it comprises a set of fine particles of raw materials whose nature is different from those of the set of raw material particles of the first layer, and/or whose particle size distribution is different. The hydraulic binder used in this other water-mixed composition may be the same or different, as may the proportions of binder and raw materials.

For example, it is conceivable that the first layer could be formed from a first dry composition comprising, by mass based on the total mass of said first dry composition, 85% red bauxite whose particle size distribution has a first reference diameter d90 less than or equal to 20 millimeters and a second reference diameter d10 greater than or equal to 0.08 micrometer and 15% Ciment Fondu® cement, and that the second layer is formed from a dry composition comprising, by mass based on the total mass of said second dry composition, 95% limestone $CaCO_3$, the particle size distribution of which has a first reference diameter d90 less than or equal to 20 millimeters and a second reference diameter d10 greater than or equal to 0.08 micrometer and 5% Ciment Fondu® cement.

It is then provided to mix this second composition with water and to introduce the second composition thus mixed into the mold already containing the first layer of material. The second composition can be mixed with water in the same proportions as the first composition or not.

For example, in the example given above, the first dry composition is mixed with 7% water, by mass based on the total mass of the first dry composition, while the second dry composition is mixed with 5% water, by mass based on the total mass of said second dry composition.

The assembly formed by the previous layer (here the first layer) and the other mixed composition covering it is then vibrated and a compressive stress is applied to said assembly.

As in the formation of the first layer, the assembly consisting of the first layer and the mixed composition covering it is first vibrated and then, while maintaining the vibration, the compressive stress is applied to the assembly.

The vibration and the application of compressive stress are in all respects similar to what has been described for the formation of the first layer. Notably, as for the formation of the first layer, the vibration is carried out at a frequency between 20 hertz and 80 hertz and at an amplitude greater than or equal to 0.3 millimeter, while the compressive stress is not necessarily greater than or equal to 2 MPa.

Thus, step c') is carried out on the assembly formed by the first and second layers.

Vibration of the assembly formed by the first and second layers allows the particles to be optimally arranged in relation to each other.

The application of compressive stress, even low, to this assembly makes it possible to obtain regular layers after final demolding. The appearance of the final multilayer compacted material is therefore improved by intermediate compaction.

The same applies to the formation of each subsequent layer. In other words, for the formation of each subsequent layer, a new mixed composition is obtained by repeating steps a) and b) and this new mixed composition is introduced into the mold, over the previous layer, and therefore necessarily over all the previously formed layers. The assembly comprising the previously formed layers and the newly mixed composition is vibrated and then in conjunction with the vibration a compressive stress is applied to this assembly. More precisely, for each subsequent layer, step c') is carried out on the new assembly comprising the previously formed layers and the new mixed composition.

It is essential for obtaining the multilayer compacted material that the value of the applied compressive stress is greater than or equal to 2 megapascals, for example greater than or equal to 10 megapascals, at least for the production of the last layer of said multilayer compacted material, i.e. for the top layer of the stack. Thus, for the last layer, or top layer of the stack, step c) described above is carried out. It should be noted that the application of a compressive stress greater than or equal to 2 MPa on the last layer de facto results in the application of this compressive stress on all layers of the stack.

Thus, if the compacted material consists of only two layers, it is not necessary, although it is possible, that the value of the compressive stress be greater than or equal to 2 MPa for the formation of the first layer, but it is imperative that the value of the compressive stress applied for the formation of the second layer be greater than or equal to 2 MPa. Preferably, the value of the compressive stress applied to form the second layer will be greater than or equal to 5 MPa, or even greater than or equal to 10 MPa.

Preferably, during the manufacture of multilayer compacted materials according to this process, the intermediate compressive stress received by the water-mixed composition forming either the first layer of the compacted material or an intermediate layer of said compacted material, is lower than the final compressive stress directly preceding the demolding of the multilayer compacted material. Notably, the intermediate compressive stress can be less than 2 megapascals. For example, it can be of the order of 0.1 megapascal.

In other words, it is not necessary for the totality of all the compressive stresses received by the multilayer compacted material during the multiple steps c) of the process for obtaining the multilayer compacted material to be greater than or equal to 2 MPa in order to implement the process of the invention. On the contrary, it is sufficient that one of the compressive stresses implemented during one of the steps c) of the process according to the invention is greater than or equal to 2 MPa for the process to be implemented according to the invention. Preferably, the last compressive stress, directly preceding the demolding of the multilayer compacted material, is greater than or equal to 2 MPa, better greater than or equal to 5 MPa, and even more preferentially greater than or equal to 10 MPa.

The application of at least one very high compressive stress for the final layer of the multilayer material ensures that all layers are firmly bonded together and that the fine particles are properly agglomerated. However, a compressive stress greater than or equal to 2 MPa may be applied during the formation of each layer if needed to further enhance the compressive strength of the multilayer compacted material.

Preferably, all compressive stresses applied during the different steps of the process are applied in the same direction of compression.

Alternatively, the compressive stresses applied during the different process steps are applied in different directions of compression.

The multilayer (two or more layers) compacted material obtained can then be removed from the mold, and then possibly oven dried according to the oven drying step described above.

Furthermore, it is possible to combine the process for obtaining the multilayer compacted material comprising a core enclosed in an outer layer and one of the processes for obtaining the multilayer compacted material comprising a stack of layers. This allows the formation of a hybrid multilayer compacted material having both a core enclosed in a first layer, and at least one second layer superimposed on the assembly comprising said core enclosed in said first layer.

Of course, it is possible, by combining the steps of the various processes described, to obtain hybrid multilayer compacted materials comprising both several cores enclosed in several outer layers and several superimposed layers. It is essential that during the formation of the last layer, the applied compressive stress is greater than or equal to 2 MPa, but for intermediate layers, this is not imperative.

Advantageously, irrespective of the number of layers of the multilayer compacted material formed, said layers of raw materials are inert with respect to each other up to a predetermined threshold temperature. In other words, the layers do not react with each other until the temperature reaches a predetermined threshold temperature that is significantly higher than the ambient temperature. In other words, the raw materials in one layer do not react with the raw materials in a neighboring layer until the predetermined threshold temperature is reached. In particular, they do not react with each other until they reach a temperature of 500° C. or more. Alternatively, they do not react with each other until they reach a temperature greater than or equal to 400° C., or greater than or equal to 300° C., or greater than or equal to 200° C., or greater than or equal to 110° C. This is true both for the multilayer compacted material with layer stacking, as well as for the multilayer compacted material with a core enclosed in an outer layer and for the hybrid multilayer compacted material.

In particular, in the multilayer compacted material comprising at least one core enclosed in at least one outer layer, the raw materials of the core are inert with respect to the raw materials of the outer layer(s), up to the predetermined threshold temperature.

Regardless of the number of layers of the multilayer compacted material formed, said multilayer compacted material has, like the single-layer compacted material, a compressive strength greater than or equal to 3 megapascals. Thus, the multilayer compacted material can be handled without decomposition.

Furthermore, in the multilayer compacted material, all layers in contact with the outside generate few secondary fine particles, at least up to the melting temperature of the multilayer compacted material.

Thus, in the case of multilayer compacted material with stacked layers, each layer of the multilayer compacted material generates few secondary fine particles, at least up to the melting temperature of said multilayer compacted material. In the case of multilayer compacted material comprising a core enclosed in an outer layer, the outer layer generates few secondary fine particles, at least up to the melting temperature of said multilayer compacted material.

The melting temperature of the multilayer compacted material can be predetermined by suitably selecting the hydraulic binder of the composition of each layer of said multilayer compacted material.

Preferably, in the case of multilayer compacted material with a core enclosed in at least one outer layer, the melting temperature of said multilayer compacted material can be predetermined by suitably selecting the hydraulic binder of the composition of the outer layer.

By virtue of the process according to the invention it is possible to manufacture multilayer compacted materials, comprising notably a stack of layers, a core enclosed in an outer layer, or a combination of these configurations. These multilayer compacted materials can be used in industrial processes requiring the input of at least two types of raw materials, notably in smelting processes that may require the use of blocks of raw materials rich in alumina (pure or partially hydrated) and in lime (pure or partially carbonated).

In practice, the multilayer compacted material can be designed to have a chemical composition close to that desired for the product obtained from said industrial process. Controlling the composition of the multilayer material improves the control of chemical reactions within industrial processes, particularly in smelting furnaces by homogenizing the chemical composition within these furnaces. This limits the production of downgraded or non-standard products, while avoiding certain classic phenomena when two raw materials are used in an industrial process, such as the sticking together of raw materials or the advancing of a slope (especially in smelting furnaces).

EXAMPLES

The remainder of the description presents various examples of compacted materials manufactured according to the process of the invention and according to other processes not in accordance with the invention for comparison. The compacted materials formed are then characterized by mechanical tests.

I. Manufacturing Devices

The compacted materials manufactured according to the process of the invention can be obtained on a so-called "miniature" or "laboratory" device.

The miniature device comprises a press marketed under the name Styl'One Evolution by MEDELPHARM company, combined with a vibration generating device. The Styl'One press has two opposing punches, a lower and an upper punch. Here, the upper punch is used to apply the compressive stress by exerting a force of up to 50 kilonewtons (kN). The lower punch is held in the stop position and connected to the vibration generating device.

The vibration generating device comprises a rotation axis, one end of which is in contact with the lower punch and the other end of which carries an unbalance exciter, i.e. a mass whose shape is asymmetrical in relation to the rotation axis. The unbalance exciter can weigh between 3 grams and 16 grams and can be rotated at a speed between 40 revolutions per second (40 Hz) and 60 revolutions per second (60 Hz). Thanks to this system, the vibration amplitudes are between 0.35 millimeter and 1.05 millimeters.

The water-mixed composition is introduced into a rectangular-section steel mold, measuring 23 millimeters wide by 31 millimeters long, and placed centrally in relation to the axis of the two punches. The compressive stress to which the composition contained in the mold is subjected is then a maximum of 70 MPa. In practice, it will be chosen here equal to 11 MPa.

The manufacturing conditions of the materials compacted in the miniature device are summarized in Table I-A below:

TABLE I-A

| Compression time | 1 minute |
| Compressive stress | 11 MPa |
| Vibration frequency | 60 Hz |
| Vibration amplitude | Between 0.35 mm and 1.05 mm |

The compacted product thus obtained is manually demolded, then placed for 24 hours in a drying oven at 20° C., and at a relative humidity of 90%.

The compacted materials manufactured according to the process of the invention can be obtained on a so-called "pilot" device.

The pilot device comprises a vibrating press as described in patent application EP1875996 of the company QUADRA.

The installation comprises a raw material mixing station mounted above the casting/molding station for the formulated material.

The water-mixed composition is prepared with a conical mixer. It is then introduced into a mold containing 30 impressions of briquettes, made of 4 cm thick steel, in order to be able to withstand pounding pressures of up to 25 MPa. The mold is placed under the punches. The compressive stress undergone by the composition contained in the mold will be here between 1.5 and 25 MPa.

The manufacturing conditions of the materials compacted in the pilot device are summarized in Table I-B below:

TABLE I-B

| Compression time | 10 seconds |
| Compressive stress | Between 1.5 MPa and 25 MPa |
| Vibration frequency | 68 Hz |
| Vibration amplitude | Greater than 1 mm |

The compacted product thus obtained is manually demolded, then placed in a drying oven for 24 hours at 18° C., and at a relative humidity of 95%.

II. Resistance and Crumbling Tests

Once obtained, the compacted materials are mechanically tested in order to evaluate their mechanical compressive strength and their crumbling rate, the latter reflecting the greater or lesser generation of secondary fine particles.

A mechanical compressive strength greater than or equal to 3 MPa ensures that the compacted material can be handled and transported without breaking. It is therefore considered satisfactory in the context of the present invention.

A low crumbling rate, i.e. less than or equal to 15%, is synonymous with a high abrasion resistance and therefore a low generation of secondary fine particles during the various handling of the compacted material and/or during its use in an industrial process. Such a crumbling rate is considered satisfactory in the context of the present invention.

Whether it is to evaluate their resistance to mechanical compression or their crumbling rate, the compacted materials can be tested after the step d) of oven drying said compacted materials directly following their demolding, or after a firing simulating their introduction into an industrial process at high temperature, said firing being itself carried out after the step d) of oven drying said compacted materials.

When compacted materials are tested directly after step d) of oven drying, at room temperature and without further heat treatment, these tests are referred to as "cold" tests.

Conversely, when they are tested after firing, they are called "hot" tests. In practice, the firing of compacted materials is divided into three phases: a first phase of temperature rise of 50° C. per hour, a second phase called "plateau" lasting 1 hour 45 minutes at a set temperature here chosen equal to 700° C. or 900° C., and a third phase of cooling at 50° C. per hour. The compacted materials are tested after their return to room temperature.

II.1 Mechanical Compressive Strength

The mechanical compressive strength, expressed in megapascals (MPa) is evaluated according to the protocol described in norm EN 196, on a so-called 3R press typical of the evaluation of cementitious materials. The press is marketed under the name Ibertest®.

In practice, the compacted material is placed on a fixed plate and centered under a movable upper punch adapted to apply a predetermined compressive force to the compacted material.

The punch is first brought into contact with the material and a compressive force is then applied to the compacted material in the same direction as that applied during the manufacture of the compacted material. The compressive force is applied until the material breaks. The compressive strength (Rc) of the compacted material corresponds in practice to the stress applied at the time of material failure. The rise in compression is of the order of 2400 newtons per second, and the maximum force that can be applied is 200 kilonewtons. The test will be carried out on a minimum of three samples. The average is then taken and considered as the mechanical compressive strength of the material studied.

II.2 Crumbling Rate

Two tests for measuring the crumbling rate are possible, depending on the size of the compacted materials obtained: the concrete mixer test for large-dimension compacted materials (over 10 centimeters); and the jar test for smaller-dimension materials.

The concrete mixer test is based on the ASTM "Los Angeles" test for evaluating aggregate attrition.

In practice, five large compacted materials are weighed and then placed in a 174 liter steel concrete mixer (model RS180 LESCHA), 60 cm in diameter, rotating at 24 revolutions per minute. The compacted materials are left for 30 minutes in the rotating concrete mixer.

The contents of the concrete mixer are then sieved at 40 mm, and the fine particles passing through the sieve are considered to be secondary fine particles. Larger pieces that did not pass through the sieve are weighed for comparison with the initial mass fed into the concrete mixer.

More precisely, it is possible to calculate the crumbling rate T, or rate of secondary fine particles generated, as the difference between the initial mass and the final mass of the compacted material, relative to the initial mass, also expressed according to the following formula:

$T$=[Initial mass−Final mass]/Initial mass.

The jar test is used to evaluate the generation of secondary fine particles in the compacted materials obtained with the miniature device.

Similarly, several blocks of compacted material, for example 5, are weighed and placed in a 6 liter cylindrical jar, 15 centimeters in diameter and 15 centimeters high, the inside of which is covered with Linatex, a very smooth rubber-like material. The jar is rotated at 45 revolutions per minute for 30 minutes (1350 revolutions in total) and the loss of mass of the compacted materials is evaluated.

As in the concrete mixer test, it is then possible to calculate the crumbling rate T, or rate of generation of secondary fine particles, according to the following formula:

$T$=[Initial mass−Final mass]/Initial mass.

III. Compacted Materials Manufactured

Different examples of compacted materials were manufactured from various raw materials and hydraulic binders.

III.1 Raw Materials

The raw materials used in the different examples are red bauxite and white bauxite. It is also possible to use limestone, carbon black and rock wool.

The carbon black that could be used is for example the one marketed under the name Thermax®N990. It consists of 99.1% by mass of amorphous carbon black.

The rockwool that could be used is for example the one marketed under the name Le Flocon 2®-Rockwool.

Alternatively, 99.5% pure alumina by mass, hereinafter referred to as "test alumina", may be used.

Table II shows the chemical composition of other raw materials that are or could be used, namely red bauxite, white bauxite and limestone, as a percentage by mass (i.e. mass in relation to the total mass of the raw material).

TABLE II

| Chemical composition (mass %) | Red bauxite (type "ELMIN") | Red bauxite (type "EB") | White bauxite | Limestone |
|---|---|---|---|---|
| $SiO_2$ | 3.05 | 5.64 | 8.4 | 0.27 |
| $Al_2O_3$ | 67.59 | 61.57 | 75.6 | 3.39 |
| $Fe_2O_3$ | 23.42 | 23.05 | 3.35 | 0.14 |
| CaO | 2.28 | 5.49 | 7.15 | 95.18 |

Table III below shows the particle size and density of some of the dry raw materials, i.e. after they have been oven dried at 110° C. for 24 hours.

TABLE III

| | Red bauxite (ELMIN) | Red bauxite (type "EB") | White bauxite | Limestone $CaCo_3$ | Carbon black | Rock wool | Test alumina |
|---|---|---|---|---|---|---|---|
| d90 | 8 mm | 460 μm | 268 μm | Not measured | 1 μm | 6 μm | 23 μm |
| d10 | Between 0.315 mm and 0.5 mm | 7 μm | 6.1 μm | Not measured | 0.1 μm | 3 μm | 1.6 μm |
| Density (g/cm$^3$) | 3.40 | 3.39 | 3.25 | 2.65 | Not measured | Not measured | 3.11 |

III.2 Hydraulic Binder

The hydraulic binders used in the various examples are Ciment Fondu®, Secar®51 cement. Portland cement can also be used.

The Portland cement that could be used is the one for example marketed under the name CEM I 52.5R MILKE PREMIUM.

Tables IV and V below show, respectively, the chemical composition and mineralogical composition of Ciment Fondu® cement and of Secar®51 cement, in percentage by mass (by mass based on the total mass of the cement under consideration).

TABLE IV

| Chemical composition (mass %) | Ciment Fondu ® | Secar ®51 |
|---|---|---|
| $SiO_2$ | 4.4 | 4.99 |
| $Al_2O_3$ | 40.2 | 51.78 |
| $Fe_2O_3$ | 15.7 | 2.05 |
| CaO | 36.8 | 37.56 |

FIG. 2 shows the particle size distribution of two of the batches of fine particles of raw materials used, namely fine particles of white bauxite known as "ABP" and fine particles of red bauxite known as "ELMIN", as well as those of two of the batches of fine particles of cements used, namely Ciment Fondu® cement and Secar® 51 cement. In FIG. 2, the y-axis represents the percentage of fine particles with a diameter equal to the dimension indicated on the x-axis, by volume based on the total volume of the fine particle set of each batch under consideration.

TABLE V

| Mineralogical composition (mass %) | Ciment Fondu ® | Secar ®51 |
|---|---|---|
| CA | 52.6 | 68.9 |
| C12A7 | 3.2 | 0.3 |
| C2AS | 5.4 | 21.7 |
| C2S-α | — | 1.5 |
| C2S-β | — | 2 |
| C2S | 6.9 | — |
| Ferrites | 10.6 | — |
| Perovskite | 8 | 4.2 |

Table VI below shows the particle size distribution of Ciment Fondu® and Secar® 51 cements.

TABLE VI

| Mineralogical composition (mass %) | Ciment Fondu ® | Secar ®51 |
|---|---|---|
| Blaine specific surface area ($cm^2/g$) | 3170 | 3694 |
| d90 | 89 μm | 56 μm |
| d10 | 2 μm | 5 μm |
| d50 | 23 μm | 15 μm |

III.3 Compacted Materials

Example 1

In Example 1, the compressive strength and the crumbling rate of a compacted material of red bauxite particles obtained according to the process of the invention (Example 1a) were compared with those of a natural block of red bauxite (Example 1ref), and to those of a compacted material of red bauxite particles obtained according to a process not in accordance with the invention (Example 1b). Here, the process not in accordance with the invention differs from the process according to the invention in that it does not use vibration.

Step a): the dry composition used to manufacture the compacted materials in Examples 1a and 1b comprises, by mass based on the total mass of the dry composition, 85% red bauxite of the "ELMIN" type and 15% Ciment Fondu® cement, the respective properties of which have been described in Parts III.1 and III.2.

In practice, all the red bauxite particles have been sieved with a 560 micrometer sieve so that its particle size distribution has a first reference diameter d90 equal to 520 micrometers, a second reference diameter d10 equal to 5.6 micrometers, and a median diameter d50 equal to 255 micrometers.

Step b): this dry composition is mixed with 10% water, by mass based on the total mass of the dry composition. To do this, the water-mixed composition is mixed by hand for 1 minute.

Step c): for example 1a, the water-mixed composition is then introduced into the mold described in point I (Manufacturing device), so that it can be processed by the miniature device which uses vibration.

For example 1b, the water-mixed composition is processed by the miniature device, which does not use any vibration.

Table VII below summarizes the conditions for obtaining the compacted materials of Examples 1a and 1b.

TABLE VII

| | Example 1a | Example 1b |
|---|---|---|
| Red bauxite | 15.5 g | 15.5 g |
| Grain size (bauxite) | d90 = 520 μm | d90 = 520 μm |
| | d10 = 5.6 μm | d10 = 5.6 μm |
| Ciment Fondu ® | 2.7 g | 2.7 g |
| Mixing water | 1.8 g | 1.8 g |
| Mixing time | 1 minute | 1 minute |
| Manufacturing device | miniature | miniature |
| Compression time | 1 minute | 1 minute |
| Compressive stress | 11 MPa | 11 MPa |
| Vibration frequency | 60 Hz | 0 Hz |
| Vibration amplitude | 1.05 mm | 0 mm |

Table VIII below summarizes the results obtained for the compacted materials in Examples 1a and 1b and for the natural red bauxite block (example 1ref).

The crumbling rate was measured according to the jar test for the compacted materials in Examples 1a and 1b and according to the concrete mixer test for natural bauxite block.

TABLE VIII

| | | Example 1a | Example 1b | Example 1ref |
|---|---|---|---|---|
| Cold tests | Density | 2.40 g/cm$^3$ | 2.38 g/cm$^3$ | 3.5 g/cm$^3$ |
| | Mechanical compressive strength | 36.8 MPa | 30.0 MPa | 64 MPa |
| | Crumbling rate | 2.6% | 2.6% | 6.1% |

TABLE VIII-continued

|  |  | Example 1a | Example 1b | Example 1ref |
|---|---|---|---|---|
| Hot tests | Density | 2.30 g/cm$^3$ | 2.2 g/cm$^3$ | 2.9 g/cm$^3$ |
|  | Mechanical compressive strength | 56.0 MPa | 55.9 MPa | 86 MPa |
|  | Crumbling rate | 2.3% | 2.3% | 17.3% |

According to the results obtained, the process according to the invention makes it possible to obtain compacted materials (Example 1a) having a mechanical compressive strength, when cold, greater than that of the compacted materials obtained according to the process not in accordance with the invention (Example 1b). Thus, subjecting the composition to vibration, both prior to the application of compressive stress and during said application, improves the cold mechanical compressive strength (here, improvement of 23% of said cold mechanical compressive strength).

In addition, the compacted material obtained according to the process of the invention (Example 1a) has a much lower crumbling rate than the natural red bauxite block (Example 1ref), both hot and cold. Indeed, by virtue of the process according to the invention, the compacted material generates, when cold, about 2.5 times less secondary fine particles than the natural block, and, when hot, about 6 times less secondary fine particles than said natural block.

Example 2

Example 2 uses the principle of Example 1, but with compacted material of white bauxite particles and a natural block of white bauxite.

Thus, in Example 2, the compressive strength and the crumbling rate of a compacted material of white bauxite particles obtained according to the process of the invention (Examples 2a, 2c) were compared with those of a natural block of white bauxite (Example 2ref), and with those of a compacted material of white bauxite particles obtained by a process not in accordance with the invention (Examples 2b, 2d). Here, as in Example 1, the process not in accordance with the invention differs from the process according to the invention in that it does not use vibration.

Step a): the dry composition used to make the compacted materials in Examples 2a and 2b comprises, by mass based on the total mass of the dry composition, 85% white bauxite and 15% Secar® 51 cement, whose respective properties have been described in Parts III.1 and III.2.

The dry composition used to make the compacted materials in Examples 2c and 2d comprises, by mass based on the total mass of the dry composition, 50% white bauxite, 35% of 99.5% pure test alumina by mass and 15% Secar® 51 cement, whose respective properties have been described in Parts III.1 and III.2.

Step b): The dry compositions of Examples 2a, 2b, 2c and 2d are mixed with 10% water, by mass based on the total mass of the corresponding dry composition. They are hand-mixed for 1 minute.

Step c): for Examples 2a and 2c the water-mixed compositions are processed by the miniature device which uses vibration at a frequency of 60 Hz and 0.35 millimeter amplitude, and a compressive stress of 11 MPa.

For Examples 2b and 2d, the water-mixed compositions are processed by the miniature device which uses a compressive stress of 11 MPa but no vibration.

Table IX below summarizes the conditions for obtaining the compacted materials in Examples 2a and 2b.

TABLE IX

|  | Example 2a | Example 2b |
|---|---|---|
| White bauxite | 15.5 g | 15.5 g |
| Grain size (bauxite) | d90 = 268 μm | d90 = 268 μm |
|  | d10 = 6.1 μm | d10 = 6.1 μm |
| Secar ®51 | 2.7 g | 2.7 g |
| Mixing water | 1.8 g | 1.8 g |
| Mixing time | 1 minute | 1 minute |
| Manufacturing device | miniature | miniature |
| Compression time | 1 minute | 1 minute |
| Compressive stress | 11 MPa | 11 MPa |
| Vibration frequency | 60 Hz | 0 Hz |
| Vibration amplitude | 0.35 mm | 0 mm |

Table X below summarizes the results obtained for the compacted materials in Examples 2a, 2b, 2c and 2d and for the natural white bauxite block (example 2ref). The crumbling rate was measured according to the jar test for the compacted materials in Examples 2a and 2b and according to the concrete mixer test for the natural bauxite block.

TABLE X

|  |  | Example 2a | Example 2b | Example 2ref | Example 2c | Example 2d |
|---|---|---|---|---|---|---|
| Cold tests | Density | 2.50 g/cm$^3$ | 2.27 g/cm$^3$ | 2.34 g/cm$^3$ | 2.18 g/cm$^3$ | 1.96 g/cm$^3$ |
|  | Mechanical compressive strength | 39.9 MPa | 37.7 MPa | 99 MPa | 12.2 MPa | 14.8 MPa |
|  | Crumbling rate | 4.1% | 6.8% | 9.4% | 6.9% | 8.2% |
| Hot tests | Density | 2.12 g/cm$^3$ | 2.12 g/cm$^3$ | 2.18 g/cm$^3$ | 1.69 g/cm$^3$ | 1.70 g/cm$^3$ |
|  | Mechanical compressive strength | 29.5 MPa | 29.1 MPa | 35 MPa | 14.8 MPa | 8.8 MPa |
|  | Crumbling rate | 7.6% | 16.8% | 16.0% | 13.9% | 20.6% |

Thus, as shown in Example 1, the cold mechanical compressive strength is improved for compacted materials obtained according to the process of the invention (Example 2a) compared with those obtained according to the process not in accordance with the invention (Example 2b) which does not use vibration.

As in Example 1, the crumbling rate of the compacted material obtained according to the process of the invention (Example 2a) is also much lower than that of the natural white bauxite block (Example 2ref), both hot and cold.

Finally, by comparing the results of Examples 1a and 2a, it can be seen that the process according to the invention makes it possible to obtain materials compacted with different raw materials, in this case both with white bauxite particles and with red bauxite particles. In both cases, both hot and cold, the mechanical compressive strength is well above 10 MPa and the crumbling rate is less than 10%.

Example 3

In Example 3, the compressive strength and the crumbling rate were compared for materials compacted according to the process of the invention (Examples 1a and 2a), and for materials compacted under very high compressive stress but without vibration (Examples 3a, 3b and 3d).

In Examples 3a, 3b and 3d, regardless of the water-mixed composition formed, said composition is then introduced into a cylindrical mold 39 millimeters in diameter and 80 millimeters high, in order to receive a compressive stress of the order of 40 MPa, by a hydraulic press marketed under the name Zwick®.

In Example 3c, the compressive strength of a material without a hydraulic binder, compacted under very high compressive stress, without vibration was also evaluated.

Table XI below summarizes the conditions for obtaining the compacted materials of Examples 3a, 3b, 3c and 3d.

TABLE XI

|  | Example 3a | Example 3b | Example 3c | Example 3d |
|---|---|---|---|---|
| Raw material particles | 85 g red bauxite | 85 g red bauxite | 85 g red bauxite | 85 g white bauxite |
| Grain size (bauxite) | d90 = 3.5 mm d10 = 315 μm | d90 = 3.5 mm d10 = 315 μm | d90 = 3.5 mm d10 = 315 μm | d90 = 268 μm d10 = 6.1 μm |
| Hydraulic binder | 15 g Ciment Fondu® | 15 g Secar®51 cement | 0 | 15 g Secar®51 cement |
| Mixing water | 7 g | 7 g | 0 | 12 g |
| Mixing time | 1 minute | 1 minute | 1 minute | 1 minute |
| Manufacturing device | Zwick hydraulic press | Zwick hydraulic press | Zwick hydraulic press | Zwick hydraulic press |
| Compression time | 5 seconds | 5 seconds | 5 seconds | 5 seconds |
| Compressive stress | 40 MPa | 40 MPa | 40 MPa | 40 MPa |
| Vibration frequency | 0 Hz | 0 Hz | 0 Hz | 0 Hz |
| Vibration amplitude | 0 mm | 0 mm | 0 mm | 0 mm |

The dry composition used to make the compacted materials in Examples 3a and 3b comprises, by mass based on the total mass of the dry composition, 85% red bauxite and 15% Ciment Fondu® or Secar® 51 cement, the respective properties of which have been described in Parts III.1 and III.2.

Table XII below summarizes the results obtained for the compacted materials in Examples 3a, 3b, 3c and 1a which can be directly compared. The crumbling rate was measured according to the jar test for compacted materials in Examples 3a, 3b and 3d.

TABLE XII

|  |  | Example 3a | Example 3b | Example 3c | Example 1a |
|---|---|---|---|---|---|
| Cold tests | Density | 2.42 g/cm³ | — | — | 2.40 g/cm³ |
|  | Mechanical compressive strength | 30.4 MPa | 31.1 MPa | 0 MPa | 36.8 MPa |
|  | Crumbling rate | 11.4% | — | — | 2.6% |
| Hot tests | Density | 2.14 g/cm³ | — | — | 2.30 g/cm³ |
|  | Mechanical compressive strength | 25 MPa | — | — | 56.0 MPa |
|  | Crumbling rate | 27% | — | — | 2.3% |

In practice, the red bauxite particle set has been sieved with a 4 mm sieve so that its particle size distribution has a first reference diameter d90 equal to 3.5 millimeters, a second reference diameter d10 equal to 315 micrometers, and a median diameter d50 equal to 2 millimeters.

The dry composition of Examples 3a and 3b is mixed with 7% water, by mass based on the total mass of the dry composition.

The dry composition used to make the compacted material in Example 3d consists of 85% white bauxite and 15% Ciment Fondu®, whose respective properties have been described in Parts III.1 and III.2. In this case, the dry composition is mixed with 12% water, by mass based on the total mass of the dry composition.

Table XIII below summarizes the results obtained for the compacted materials in Examples 3d and 2a which can be directly compared.

TABLE XIII

|  |  | Example 3d | Example 2a |
|---|---|---|---|
| Cold tests | Density | 2.16 g/cm³ | 2.50 g/cm³ |
|  | Mechanical compressive strength | 23.3 MPa | 39.9 MPa |
|  | Crumbling rate | — | 4.1% |

TABLE XIII-continued

|  |  | Example 3d | Example 2a |
|---|---|---|---|
| Hot tests | Density | 1.74 g/cm³ | 2.12 g/cm³ |
|  | Mechanical compressive strength | 9.8 MPa | 29.5 MPa |
|  | Crumbling rate | 48% | 7.6% |

The results in Tables XII and XIII show that when the material is subjected to very high compressive stress but no vibration during manufacture (Examples 3a, 3b and 3d), its compressive strength is lower than when it is subjected to both high compressive stress and vibration (Examples 1a and 2a). Thus, subjecting the material to very high compressive stress during its manufacture is not sufficient to improve its mechanical compressive strength. It is indeed the combination of the application of a high compressive stress and of a vibration, said vibration being implemented both during and prior to said compression, which makes it possible to generate compacted materials having a satisfactory mechanical compressive strength.

In addition, the results in Tables XII and XIII show that subjecting the material to vibration in combination with high compressive stress (Examples 1a and 2a) significantly reduces the rate of hot and cold crumbling compared with subjecting the material only to high compressive stress (Examples 3a, 3b and 3d) without vibration. Submitting the material to a very high compressive stress during its manufacture does not reduce its crumbling rate below that of a natural block. It is indeed the combination of the application of a high compressive stress and a vibration, said vibration being implemented both during and prior to said compression, which makes it possible to generate compacted materials having a satisfactory crumbling rate.

Finally, Example 3c shows that the hydraulic binder plays an essential role in the strength of the compacted material. In other words, fine particles of raw materials, even when subjected to very high compressive stress, do not develop sufficient cohesion to hold together mechanically. Thus, it is necessary to use a hydraulic binder to agglomerate said fine particles of raw materials together.

Example 4

In Example 4, the compressive strength and the crumbling rate were compared for materials compacted by the process of the invention (Examples 1a and 2a) and for materials compacted by a process involving low compressive stress and vibration (Examples 4a and 4b).

The dry composition used to make the compacted materials in Examples 4a and 4b comprises, by mass based on the total mass of the dry composition, 85% red bauxite (Example 4a) or white bauxite (Example 4b), and 15% Ciment Fondu® (Example 4a) or Secar®51 (Example 4b) cement, whose respective properties have been described in Parts III.1 and III.2.

In these two examples 4a and 4b, the dry composition is mixed with 4% water, by mass based on the total mass of the dry composition. The composition thus mixed is introduced into a oiled, large steel mold. The mold here has a square section of 100 millimeters on each side. The mold is placed under a large press with a vibrating table. In practice, the water-mixed composition introduced into the mold is vibrated before and during the application of the compressive stress.

The manufacturing conditions of the materials compacted in the laboratory device are summarized in Table XIV below:

TABLE XIV

|  | Example 4a | Example 4b |
|---|---|---|
| Raw material particles | 1955 g of red bauxite | 1955 g of white bauxite |
| Grain size (bauxite) | d90 = 3.5 mm | d90 = 268 µm |
|  | d10 = 315 µm | d10 = 6.1 µm |
| Hydraulic binder | 345 g of Cement Fondu® | 345 g of Secar® 51 cement |
| Mixing water | 95 g | 95 g |
| Compression time | 30 seconds | 30 seconds |
| Compressive stress | 0.04 MPa | 0.04 MPa |
| Vibration frequency | 50 Hz | 50 Hz |
| Vibration amplitude | 2 mm | 2 mm |

The compacted materials of Examples 4a and 4b thus obtained are manually demolded and then placed in a drying oven for 24 hours at 20° C. and 90% relative humidity.

Table XV below summarizes the results obtained for the compacted materials in Examples 4a and 1a, on the one hand, and 4b and 2a, on the other. The crumbling rate was measured according to the concrete mixer test for the compacted materials in Examples 4a and 4b.

TABLE XV

|  |  | Example 4a | Example 1a | Example 4b | Example 2a |
|---|---|---|---|---|---|
| Cold tests | Density | 2.68 g/cm³ | 2.40 g/cm³ | 2.32 g/cm³ | 2.50 g/cm³ |
|  | Mechanical compressive strength | 23.9 MPa | 36.8 MPa | 26.9 MPa | 39.9 MPa |
|  | Crumbling rate | 12.4% | 2.6% | 10.3% | 4.1% |
| Hot tests | Density | 2.01 g/cm³ | 2.30 g/cm³ | 2.18 g/cm³ | 2.12 g/cm³ |
|  | Mechanical compressive strength | 15.2 MPa | 56.0 MPa | 27.9 MPa | 29.5 MPa |
|  | Crumbling rate | 20.7% | 2.3% | 49.2% | 7.6% |

Comparison of the results obtained with the compacted materials of Examples 4a and 1a, on the one hand, and 4b and 2a, on the other, shows that the mechanical compressive strength, both cold and hot, is improved in the case where the material is obtained according to the process of the invention compared with the case where the material is obtained according to an existing process involving low compressive stress and vibration. In particular, the mechanical compressive strength is multiplied by 3 between Examples 4a and 1a.

Thus, the application of high compressive stress, combined with the application of vibration, both prior to and during the application of compressive stress, results in compacted materials with improved compressive strength compared with compacted materials obtained by existing processes.

The crumbling rate of compacted materials obtained according to the process of the invention is also lowered compared with that of natural blocks and compared with that of compacted materials obtained by the existing process involving low compressive stress and vibration.

Thus, it is clear from the entire description and the examples that the combination of the application of vibration and high compressive stress results in compacted materials with satisfactory compressive strength and crumbling rate.

It is also shown that the combination of the application of compressive stress and vibration according to the invention increases the density of the compacted material, which indicates a decrease in porosity and a homogeneous distribution of the constituents of the composition in the compacted material (no segregation, sedimentation or inhomogeneous distribution of the constituents).

Example 5

In Example 5, a compacted two-layer material of red bauxite particles and limestone is obtained by a process in accordance with the invention (Example 5a).

The dry compositions used to make the compacted material in Example 5a comprise respectively, by mass based on the total mass of said dry composition, for the first layer 85% red bauxite of the "EB" type and 15% Ciment Fondu® cement, and for the second layer 95% limestone $CaCO_3$ and 5% Ciment Fondu® cement whose respective properties have been described in Parts III.1 and III.2.

In this Example 5a, the dry composition for the first layer is mixed with 7% water, by mass based on the total mass of said dry composition. The dry composition for the second layer is mixed with 5% water, by mass based on the total mass of said dry composition. The composition for the first layer thus mixed is introduced into an oiled, large steel mold. The mold here has a square section of 100 millimeters on each side. The composition for the second layer thus mixed is then introduced onto the composition for the first layer in said mold. The mold is placed under a large press with a vibrating table. In practice, the two water-mixed compositions introduced into the mold are vibrated before and during the application of the compressive stress.

The manufacturing conditions of the compacted material in the laboratory device are summarized in Table XVI below:

TABLE XVI

|  |  | Example 5a |
|---|---|---|
| First layer | Raw material particles | 42.5 g of red bauxite |
|  | Grain size (bauxite) | d90 = 460 μm |
|  |  | d10 = 7 μm |
|  | Hydraulic binder | 3.75 g of Cement Fondu ® |
|  | Mixing water | 3.2 g |
|  | Mixing time | 30-40 seconds |
| Second layer | Raw material particles | 47.5 g of limestone |
|  | Grain size (limestone) | d90 < 1 mm |
|  |  | d10 = 70 μm |
|  | Hydraulic binder | 1.25 g of Cement Fondu ® |
|  | Mixing water | 2.4 g |
|  | Mixing time | 30-40 seconds |
| Two layers | Manufacturing device | Miniature |
|  | Compression time | 1 minute |
|  | Compressive stress | 11 MPa |
|  | Vibration frequency | 60 Hz |
|  | Vibration amplitude | 0.35 mm |

Table XVII below summarizes the results obtained for the compacted two-layer material in Example 5a.

The crumbling rate was measured according to the jar test for the compacted materials in Example 5a.

TABLE XVII

|  |  | Example 5a |
|---|---|---|
| Cold tests | Density | 2.04 g/cm³ |
|  | Mechanical compressive strength | 6.9 MPa |

Thus, it is shown that the process according to the invention makes it possible to obtain compacted two-layer materials whose mechanical compressive strength is quite satisfactory.

Example 6

In Example 6, the compressive strength and density of a compacted material of red bauxite particles obtained according to the process of the invention at different compression values (Examples 6a to 6f) were compared.

The manufacturing conditions of the material compacted in the pilot device are summarized in Table XVIII below:

TABLE XVIII

|  | Example 6a | Example 6b | Example 6c | Example 6d | Example 6e | Example 6f |
|---|---|---|---|---|---|---|
| Raw material particles | 185 kg of red bauxite | 185 kg of red bauxite | 185 kg of red bauxite | 185 kg of red bauxite | 185 kg of red bauxite | 185 kg of red bauxite |
| Grain size (bauxite) | d90 < 8 mm d10 < 315 μm | d90 < 8 mm d10 < 315 μm | d90 < 8 mm d10 < 315 μm | d90 < 8 mm d10 < 315 μm | d90 < 8 mm d10 < 315 μm | d90 < 8 mm d10 < 315 μm |
| Hydraulic binder | 35 kg of Ciment Fondu ® | 35 kg of Ciment Fondu ® | 35 kg of Ciment Fondu ® | 35 kg of Ciment Fondu ® | 35 kg of Ciment Fondu ® | 35 kg of Ciment Fondu ® |
| Mixing water | 16.5 kg | 16.5 kg | 16.5 kg | 16.5 kg | 16.5 kg | 16.5 kg |
| Compression time | 10 seconds | 10 seconds | 10 seconds | 10 seconds | 10 seconds | 10 seconds |
| Compressive stress | 4 MPa | 8 MPa | 12 MPa | 16 MPa | 20 MPa | 25 MPa |
| Vibration frequency | 68 Hz | 68 Hz | 68 Hz | 68 Hz | 68 Hz | 68 Hz |
| Vibration amplitude | Approx. 1-2 mm | Approx. 1-2 mm | Approx. 1-2 mm | Approx. 1-2 mm | Approx. 1-2 mm | Approx. 1-2 mm |

Table XIX below summarizes the results obtained for the compacted materials in Examples 6a to 6f.

TABLE XIX

| | | Example 6a | Example 6b | Example 6c | Example 6d | Example 6e | Example 6f |
|---|---|---|---|---|---|---|---|
| Cold tests | Density | 2.6 g/cm³ | 2.6 g/cm³ | 2.5 g/cm³ | 2.6 g/cm³ | 2.6 g/cm³ | 2.6 g/cm³ |
| | Mechanical compressive strength | 41 MPa | 44 MPa | 38 MPa | 50 MPa | 45 MPa | 47 MPa |
| Hot tests | Density | 2.2 g/cm³ | 2.2 g/cm³ | 2.2 g/cm³ | 2.2 g/cm³ | 2.2 g/cm³ | 2.2 g/cm³ |
| | Mechanical compressive strength | 30 MPa | 34 MPa | 33 MPa | 39 MPa | 34 MPa | 38 MPa |

Thus, it appears that whatever the value of the compressive stress, higher than 2 MPa, the process according to the invention makes it possible to obtain compacted materials whose mechanical compressive strength is extremely satisfactory, both cold and hot.

Example 7

In Example 7, the compressive strength and density of a compacted material of red bauxite particles obtained according to the process of the invention at different binder ratios (Examples 7a, 7b) were compared with Example 6b.

The manufacturing conditions of the material compacted in the pilot device are summarized in Table XX below:

TABLE XX

| | Example 7a | Example 7b |
|---|---|---|
| Raw material particles | 225 kg of red bauxite | 213 kg of red bauxite |
| Grain size (bauxite) | d90 < 8 mm<br>d10 < 315 µm | d90 < 8 mm<br>d10 < 315 µm |
| Hydraulic binder | 12 kg of Ciment Fondu ® | 24 kg of Ciment Fondu ® |
| Mixing water | 16 kg | 18 kg |
| Compression time | 10 seconds | 10 seconds |
| Compressive stress | 8 MPa | 8 MPa |
| Vibration frequency | 68 Hz | 68 Hz |
| Vibration amplitude | >1 mm | >1 mm |

Table XXI below summarizes the results obtained for the compacted materials in Examples 7a and 7b, in comparison with Example 6b.

TABLE XXI

| | | Example 7a | Example 7b | Example 6b |
|---|---|---|---|---|
| Cold tests | Density | 2.4 g/cm³ | 2.7 g/cm³ | 2.6 g/cm³ |
| | Mechanical compressive strength | 11 MPa | 38 MPa | 44 MPa |
| Hot tests | Density | 2.1 g/cm³ | 2.3 g/cm³ | 2.2 g/cm³ |
| | Mechanical compressive strength | 12 MPa | 27 MPa | 34 MPa |

Example 8 (Core)

In Example 8, the compressive strength and crumbling rate of a "core" material, also called "core-shell" compacted material of red bauxite particles with a core of a different composition are obtained by a process in accordance with the invention (Examples 8a and 8b).

The dry compositions used to make the compacted material in Example 8a comprise respectively, by mass based on the total mass of said dry composition, for the mixed composition, known as the outer layer, 85% red bauxite EB and 15% Ciment Fondu® cement, and for the core 100% red bauxite EB whose respective properties have been described in Parts III.1 and III.2.

In this Example 8a, the dry composition for the outer layer is mixed with 7% water, by mass based on the total mass of said dry composition. The dry composition for the core is mixed with 5% water, by mass based on the total mass of said dry composition.

The dry compositions used to make the compacted material in Example 8b comprise respectively, by mass based on the total mass of said dry composition, for the outer layer 85% EB red bauxite and 15% Ciment Fondu® cement, and for the core 95% EB red bauxite and 5% Ciment Fondu® cement, the respective properties of which have been described in Parts III.1 and III.2.

In this Example 8b, the dry composition for the outer layer is mixed with 7% water, by mass based on the total mass of said dry composition. The dry composition for the core is mixed with 7% water, by mass based on the total mass of said dry composition.

The composition for the core layer thus mixed is introduced into an oiled, steel, cylindrical mold with a diameter of 30 mm. The mold is placed under a large press with a vibrating table. The core is thus pressed and jointly vibrated in accordance with the process according to the invention.

Next, 16 g of the mixed outer layer is introduced into the bottom of a second cylindrical steel mold with a diameter of 40 mm, then the previously formed "core" cylinder is placed in the middle and covered with the rest of the outer layer composition.

The manufacturing conditions of the material compacted in the "miniature" laboratory device are summarized in Table XXII below:

TABLE XXII

| | | Example 8a | Example 8b |
|---|---|---|---|
| Outer layer | Raw material particles | 42.5 g of red bauxite | 42.5 g of red bauxite |
| | Grain size (bauxite) | d90 = 545 µm<br>d10 = 11 µm | d90 = 545 µm<br>d10 = 11 µm |
| | Hydraulic binder | 7.5 g of Ciment Fondu ® | 7.5 g of Ciment Fondu ® |
| | Mixing water | 3.5 g | 3.5 g |
| | Mixing time | 30-40 seconds | 30-40 seconds |
| Core | Raw material particles | 50 g red bauxite | 47.5 g red bauxite |
| | Grain size | d90 = 545 µm<br>d10 = 11 µm | d90 = 545 µm<br>d10 = 11 µm |

TABLE XXII-continued

|  |  | Example 8a | Example 8b |
|---|---|---|---|
|  | Hydraulic binder | — | 2.5 g |
|  | Mixing water | 2.5 g | 3.5 g |
|  | Mixing time | 30-40 seconds | 30-40 seconds |
| "Core-shell" | Manufacturing device | miniature | miniature |
|  | Compression time | 20 s | 20 s |
|  | Compressive stress | 10 MPa | 10 MPa |
|  | Vibration frequency | 60 Hz | 60 Hz |
|  | Vibration amplitude | 0.35 mm | 0.35 mm |

Table XXIII below summarizes the results obtained for the compacted materials in Examples 8a and 8b.

TABLE XXIII

|  |  | Example 8a | Example 8b |
|---|---|---|---|
| Cold tests | Density | 2.50 g/cm$^3$ | 2.48 g/cm$^3$ |
|  | Mechanical compressive strength | 5.4 MPa | 11.7 MPa |

Thus, the process according to the invention makes it possible to obtain compacted materials of the "core-shell" type with satisfactory mechanical compressive strength.

The invention claimed is:

1. A process for obtaining a compacted material according to which,
   a) a dry composition is formed by mixing, on the one hand, a set of raw material particles whose particle size distribution is characterized by a first reference diameter d90 less than or equal to 50 millimeters and a second reference diameter d10 greater than or equal to 0.08 micrometer with, on the other hand, from 1% to 50% of a hydraulic binder, by mass based on the total mass of the dry composition,
   b) said dry composition formed in step a) is mixed with 1% to 35% water, by mass based on the total mass of the dry composition, to form a mixed composition,
   c) the mixed composition obtained in step b) is first vibrated at a frequency between 20 hertz and 80 hertz and at an amplitude greater than or equal to 0.3 millimeter, and then a compressive stress is further applied to said mixed composition during the vibration, the value of said applied compressive stress being greater than or equal to 2 megapascals.

2. The process as claimed in claim 1, according to which,
   a first layer of material is formed with the mixed composition obtained at the end of step b),
   in a step p1) prior to step c), at least one additional mixed composition is formed by repeating steps a) and b), wherein said at least one additional mixed composition is identical or different from the mixed composition of step b),
   in a step p2), said at least one additional mixed composition obtained in step p1) is placed on top of a first layer formed at the end of step b), so as to form a stack of at least two layers of mixed compositions, and
   in step c), said stack formed in step p2) is first vibrated, at said frequency between 20 hertz and 80 hertz and at said amplitude greater than or equal to 0.3 millimeter, and then, said compressive stress is further applied to said stack during the vibration.

3. The process as claimed in claim 2, according to which, in a step n1), a core of raw materials is provided, wherein the raw materials of the core are identical to or different from the set of raw material particles of step a), said core having a mechanical strength greater than or equal to 0.1 megapascal (MPa),
   in a step n2') carried out prior to step c), said core is completely enclosed in said mixed composition obtained in step b) and/or in at least one of said other mixed compositions obtained in step p1), said mixed composition obtained in step b) and said core forming an assembly and,
   in step c), said assembly comprising said at least one mixed composition and said enclosed core is first vibrated, at said frequency between 20 hertz and 80 hertz and at said amplitude greater than or equal to 0.3 millimeter, and then, said compressive stress is further applied to said assembly during the vibration.

4. The process as claimed in claim 3, according to which, said core provided in step n1) is a compacted material.

5. A multilayer compacted material obtained according to the process of claim 2 comprising a stack of at least two superimposed layers of raw materials inert with respect to each other up to a predetermined threshold temperature.

6. The process as claimed in claim 1, according to which,
   in a step n1), a core of raw materials is provided, wherein the raw materials of the core are identical to or different from the set of raw material particles of step a), said core having a mechanical strength greater than or equal to 0.1 megapascal (MPa),
   in a step n2) carried out prior to step c), said core is completely enclosed in said mixed composition obtained in step b), said mixed composition obtained at step b) and said core forming an assembly and,
   in step c), said assembly comprising said at least one mixed composition and said enclosed core is first vibrated, at said frequency between 20 hertz and 80 hertz and at said amplitude greater than or equal to 0.3 millimeter, and then, said compressive stress is further applied to said assembly during the vibration.

7. The process as claimed in claim 6, according to which, said core provided in step n1) is a compacted material.

8. The process as claimed in claim 6, wherein:
   a first layer of material is formed with the mixed composition obtained at the end of step b),
   in a step p1) prior to step c), at least one other mixed composition is formed by repeating steps a) and b),
   in a step p2), said other mixed composition obtained in step p1) is placed on top of said first layer formed at the end of step b), so as to form a stack of at least two layers of mixed compositions, and
   in step c), said stack formed in step p2) is first vibrated, at said frequency between 20 hertz and 80 hertz and at said amplitude greater than or equal to 0.3 millimeter, and then, said compressive stress is further applied to said stack during the vibration.

9. A multilayer compacted material obtained according to the process of claim 6, comprising a core enclosed in at least one outer layer, wherein the raw materials of the core are inert with respect to the raw materials of said at least one outer layer in which it is enclosed, up to a predetermined threshold temperature.

10. A process for obtaining a multilayer compacted material comprising:
   conducting the process according to claim 1 to form a compacted material as a first layer
   and, for each subsequent layer, an additional mixed composition is made by repeating steps a) and b), wherein said additional mixed composition is identical to or different from the mixed composition of step b), said additional mixed composition is placed on top of the previous layer, the assembly thus formed by the previous layer and the additional mixed composition is vibrated, and a compressive stress is applied to said assembly, the value of the applied compressive stress being greater than or equal to 2 megapascals, at least for the making of the last layer of said multilayer compacted material.

11. The process as claimed in claim 1, according to which it is provided that the vibration implemented in conjunction with the application of the compressive stress is disharmonized.

12. The process as claimed in claim 1, according to which the vibration has an amplitude between 0.3 millimeter and 5 millimeters, according to the direction of compression.

13. The process as claimed in claim 1, according to which there is further provided a step subsequent to step c) of obtaining the compacted material, during which said compacted material is placed for at least 24 hours in a drying oven at a predetermined temperature, and at a relative humidity greater than or equal to a predetermined threshold value of relative humidity.

14. The process as claimed in claim 1, according to which the raw material particles of each set of particles are mineral particles selected from: red bauxite, white bauxite, alumina, limestone, lime, carbon, carbon graphite, carbon black, rock wool, glass wool, carbonates, metallurgical effluents, powders of manganese or its derivatives, metal ores or mixtures of ores as they may occur during extraction or during manufacturing processes.

15. The process as claimed in claim 1, according to which for at least one set of raw material particles, the first reference diameter d90 associated with the particle size distribution of said set of raw material particles is less than 20 millimeters and the second reference diameter d10 associated with said particle size distribution is greater than or equal to 0.1 micrometer.

16. The process as claimed in claim 1, according to which the hydraulic binder is selected from: Portland cements, calcium aluminate cements, sulfoaluminate cements, cements mixed with fly ash, cements mixed with blast furnace slag, cements mixed with pozzolans, or a mixture thereof.

17. The process as claimed in claim 1, according to which in step a) the hydraulic binder comprises a calcium aluminate cement having a C/A molar ratio of between 0.1 and 3.

18. The process as claimed in claim 1, according to which in step a) the hydraulic binder is composed of a set of hydraulic binder particles whose particle size distribution is characterized by a first reference diameter d90 of less than or equal to 100 micrometers.

19. A compacted material comprising raw material particles agglomerated by a hydraulic binder, obtained according to the process of claim 1.

20. The compacted material as claimed in claim 19 having a mechanical compressive strength greater than or equal to 3 megapascals and a crumbling rate less than or equal to 15%.

* * * * *